US009174365B2

(12) United States Patent
Yoneshima et al.

(10) Patent No.: US 9,174,365 B2
(45) Date of Patent: Nov. 3, 2015

(54) METHOD OF MANUFACTURING A MOLD PART

(75) Inventors: Sadayuki Yoneshima, Osaka (JP); Mitsushi Sogabe, Osaka (JP)

(73) Assignee: TANAZAWA HAKKOSHA CO., LTD., Osaka (JP)

( * ) Notice: Subject to any disclaimer, the term of this patent is extended or adjusted under 35 U.S.C. 154(b) by 376 days.

(21) Appl. No.: 13/641,657

(22) PCT Filed: Apr. 14, 2011

(86) PCT No.: PCT/JP2011/059238
§ 371 (c)(1),
(2), (4) Date: Oct. 16, 2012

(87) PCT Pub. No.: WO2011/129385
PCT Pub. Date: Oct. 20, 2011

(65) Prior Publication Data
US 2013/0026675 A1 Jan. 31, 2013

(30) Foreign Application Priority Data

Apr. 16, 2010 (JP) .................................. 2010-095338

(51) Int. Cl.
| B29C 33/38 | (2006.01) |
| B29C 33/30 | (2006.01) |
| B29C 51/40 | (2006.01) |
| B29C 51/36 | (2006.01) |
| B29C 33/10 | (2006.01) |
| B29C 33/42 | (2006.01) |
| B29C 51/42 | (2006.01) |

(52) U.S. Cl.
CPC ............. *B29C 33/3842* (2013.01); *B29C 33/10* (2013.01); *B29C 33/306* (2013.01); *B29C 33/38* (2013.01); *B29C 33/42* (2013.01); *B29C 51/36* (2013.01); *B29C 51/40* (2013.01); *B29C 51/365* (2013.01); *B29C 51/428* (2013.01)

(58) Field of Classification Search
None
See application file for complete search history.

(56) References Cited

U.S. PATENT DOCUMENTS

| 4,919,388 | A | * | 4/1990 | Koike et al. .................... 249/115 |
| 8,794,951 | B2 | * | 8/2014 | Yoneshima et al. .......... 425/190 |

FOREIGN PATENT DOCUMENTS

| JP | 59-12180 | Y2 | 4/1984 |
| JP | 62-12578 | Y2 | 4/1987 |
| JP | 62-292408 | A | 12/1987 |
| JP | 2006-167947 | A | 6/2006 |
| JP | 2009-132005 | A | 6/2009 |

* cited by examiner

*Primary Examiner* — Benjamin Schiffman
(74) *Attorney, Agent, or Firm* — Rabin & Berdo, P.C.

(57) ABSTRACT

Provided is a mold part for resin molding and a manufacturing method. A mold part for molding resin includes a base material layer, a design section and uneven sections which abut an inner surface so as to form ventilation sections. The design section has a design surface transferred by a reverse master having an uneven surface. At least the design section out of the base material layer and the design section is formed of a heat resistant material, and the mold part for resin molding is interchangeably attached to the molding tool so that a molding pressure acts in a direction to press the uneven sections against the inner surface of the molding tool at the time of molding the resin molded article.

9 Claims, 16 Drawing Sheets (A)

(B)

(A)

(B)

(C)

(D)

(E)

(A)

(B)

(C)

(E)

METHOD OF MANUFACTURING A MOLD PART

BACKGROUND OF THE INVENTION

Conventionally, a mold for resin molding in which an uneven mold surface for forming an uneven pattern is formed on a resin layer bonded to a base material and whiskers having a length of 10 to 300 µm are mixed in the resin layer has been known as an example of a mold for resin molding for manufacturing a resin molded article having an uneven pattern on a surface thereof (e.g. patent literature 1). In this mold for resin molding, the resin layer is neither deformed nor altered by heat or external force and a fine uneven pattern can be formed on a surface of a resin molded article, and a reduction in weld lines at the time of molding brought about by a heat insulation effect of the resin layer is also expected.

However, in the case of using in a vacuum molding tool for which exhaust holes need to be secured, this mold for resin molding cannot be used as the vacuum molding tool as it is since the exhaust holes are concealed by providing the surface-textured resin layer on the mold. To secure the exhaust holes formed in the mold, it is thought to perforate holes at the same positions as the exhaust holes (hereinafter, referred to as a hole forming operation) in this case by forming holes in the resin layer by wire materials inserted through the exhaust holes from the underside of the mold after the surface-textured resin layer is provided on the mold surface. However, since the vacuum molding tool has many exhaust holes, substantial effort is required for the hole forming operation. In addition, there may arise a problem that the exhaust holes are clogged at the time of vacuum molding. In such a case, it is essential to clean the holes, which also requires substantial effort.

Accordingly, it has been proposed a mold for resin molding which has air permeability without requiring substantial effort. That is, this mold for resin molding includes a molding tool, a design layer formed on an inner side of the molding tool and an air-permeable intermediate layer used to provide the design layer on an inner side surface of the molding tool. The molding tool is formed with through holes for ventilation, the design layer is formed of a resin having an uneven shape on its surface, and through holes for ventilation are perforated to communicate with the through holes for ventilation, and the air-permeable intermediate layer is continuously provided on the inner side surface of the molding tool so that an inner side surface of the design layer, the through holes for ventilation of the design layer and the through holes for ventilation of the molding tool communicate with each other (see, for example, patent literature 2).

In this mold for resin molding, exhaust holes can be easily provided at desired positions without perforating the surface-textured layer made of the resin with exhaust holes communicating with exhaust holes provided in the vacuum mold in advance. In this mold for resin molding, the exhaust holes can be easily perforated by bonding and fixing the surface-textured layer made of the resin to the mold via the "air-permeable intermediate layer" instead of directly bonding and fixing it to the mold.

That is, since the air-permeable intermediate layer is provided in this mold for resin molding, it is possible to eliminate the need for forming holes at the same positions as the through holes for ventilation, i.e. exhaust holes provided in the mold in advance and relatively easily form the through holes for ventilation, i.e. holes for exhaust. Thus, in the hole forming operation of forming the through holes for ventilation that is performed after the design layer is provided, the holes can be formed at arbitrary positions as long as they have a depth to reach the air-permeable intermediate layer. Therefore, if the through holes for ventilation are clogged during molding, holes can be easily formed at other positions even if the holes are not cleaned.

CITATION LIST

Patent Literature

Patent Literature 1: Japanese Examined Patent Publication No. H2-14173
Patent Literature 2: Japanese Re-Publication of PCT International Application No. 2008/065946

However, any of the molds for resin molding described above is a mold for resin molding in which an uneven mold surface for forming a surface texture pattern is formed on a resin layer bonded to a base material. In these molds for resin molding, the resin layer needs to be peeled off or ground and removed from the mold for resin molding or the mold for resin molding needs to be re-fabricated to change a design formed on a product, requiring substantial effort and cost to change a product design.

Further, since the surface-textured resin layer using a thermosetting resin is fixed and bonded in the mold for resin molding as disclosed in the above former (patent literature 1), this mold for resin molding cannot be applied to a molding tool made of a material having a heatproof temperature lower than a curing temperature of the surface-textured resin layer and a molding tool made of a material to which it is difficult to bond the surface-textured resin layer. Further, in the case of processing this surface-textured resin layer for a metallic molding tool, the mold is deformed due to a temperature increase and causes a problem.

On the other hand, since the surface-textured layer made of the resin and the air-permeable intermediate layer are bonded and fixed in the mold for resin molding as disclosed in the latter (patent literature 2) described above, it is forced to perform a perforating operation in an impossible posture depending on the positions where the exhaust holes are perforated. In this case, to prevent the trace of the exhaust holes from being left on a molded product surface in vacuum molding and to reverse a high-quality surface texture, the exhaust holes perforated in the design surface preferably have a diameter of 150 to 220 µm. For example, a molding tool for a door of an automotive vehicle or the like has 1500 exhaust holes or more. Thus, perforation of the exhaust holes in an impossible posture leads to very poor productivity. In the case of perforating the exhaust holes by a drill, there is a high possibility of breaking a blade of the drill if perforation is performed in an impossible posture.

Therefore, a main object of the present invention is to provide a mold part for resin molding and a manufacturing method therefor which can easily change a design on a product surface side without requiring substantial effort and cost and diversify the selection of post-processings on this design surface.

BRIEF SUMMARY OF THE INVENTION

The present invention relates to a mold part for resin molding and a manufacturing method therefor and particularly to a mold part for resin molding suitably used by being attached to a molding tool for manufacturing a resin molded article having, on a surface side thereof, decoration sections (design surface) such as a surface texture pattern (leather surface texture pattern, fine texture pattern, woodgrain pattern, pearskin pattern, leaf vein pattern, scale pattern, marble pattern, coating pattern, geometric pattern, etc.) and a mirror pattern to improve the design of a molded article as a product, and a manufacturing method therefor.

A first aspect of the present invention is directed to a mold part for resin molding which is to be attached to a molding tool and mold a resin molded article formed with a design on a product surface side, comprising a base material layer; a design section formed on a surface which is on one principal surface side of the base material layer and becomes the product surface side; and uneven sections formed on a surface located on the other principal surface side of the base material layer and to be held in contact with an inner surface of the molding tool and configured to form ventilation sections between the uneven sections and the inner surface of the molding tool; wherein the design section has a design surface transferred by a reverse master having an uneven surface; at least the design section out of the base material layer and the design section is formed of a heat resistant material; and the mold part for resin molding is interchangeably attached to the molding tool so that a molding pressure acts in a direction to press the uneven sections against the inner surface of the molding tool at the time of molding the resin molded article.

A second aspect of the present invention is an invention dependent on the invention according to the first aspect and a mold part for resin molding, wherein the design section has a design surface transferred by a reverse master having an uneven surface.

A third aspect of the present invention is an invention dependent on the invention according to the first or second aspect and a mold part for resin molding, wherein further includes a reinforcement layer for supporting and reinforcing the design section; and the reinforcement layer is formed of any one of or a plurality of heat resistant resin material, fiber material, ceramic material and metal material.

A fourth aspect of the present invention is an invention dependent on the invention according to the first aspect and a mold part for resin molding, wherein the mold part for resin molding comprises a mold part for resin molding to be interchangeably attached to a vacuum molding tool including vacuum suction holes; the mold part for resin molding further comprises through holes for vacuum suction penetrating through the mold part for resin molding; the uneven sections include recesses communicating with each other and are formed to arrange the ventilation sections between the uneven sections and an inner surface of the molding tool; the ventilation sections are capable of communicating with the vacuum suction holes of the vacuum molding tool and communicating with the through holes.

A fifth aspect of the present invention is an invention dependent on the invention according to the first or third aspect and a mold part for resin molding further comprising a heating means and/or a cooling means built in the base material layer or the reinforcement layer along a mold surface of the molding tool.

Since the mold part for resin molding according to the first to fifth aspects is configured to be attachable to and detachable from the molding tool, a product design can be easily changed without re-fabricating the molding tool every time. That is, the design section formed on the product surface side can be easily changed without requiring substantial effort and cost for fabricating various types of molding tools corresponding to different product designs.

Since this mold part for resin molding is formed of the heat resistant material and can be handled as a single part, and the molding tool as an installation partner has physicality (particularly, mechanical property, thermal property, etc.) which withstands a predetermined molding method when the mold part is attached to the molding tool, even if this mold part for resin molding does not have this physicality as a single part, this mold part for resin molding can withstand a molding pressure acting at the time of molding in a state fitted in the molding tool as an installation partner. Thus, this mold part for resin molding has high versatility regardless of the type of the mating molding tool to which the mold part is interchangeably attached (i.e. type of the molding method) and the material of the molding tool. In this case, various molding tools such as a vacuum molding tool, an injection molding tool, a compression molding tool, an extrusion molding tool, a blow molding tool can be applied as the molding tool as the installation partner of this mold part for resin molding. Further, the material of the molding tool can be applied for molding tools made of various materials such as a metal, a resin, a composite material and a woody material and for simple molding tools made of a material with insufficient durability for the use in mass-production molding.

Further, the uneven sections arranged on the other principal surface of the base material layer to be held in contact with the inner surface of the molding tool have a function of forming the ventilation sections between the uneven sections and the inner surface of the molding tool. In the case of applying this mold part for resin molding, for example, to an injection molding tool, the ventilation sections are decompressed at the time of molding to slow a cooling rate of a molding resin, more precisely transfer the design surface by the reverse master and, in addition, reduce poor appearance. When the molding is finished, a cooling gas is blown into the ventilation sections, whereby a molded article is instantaneously cooled and productivity is increased. The recesses of the uneven sections may or may not communicate with each other.

Since this mold part for resin molding can be handled as a single part as described above, it can be detached and easily cleaned, for example, when being tainted by gas burning at the time of molding a resin molded article. Further, since this mold part for resin molding can be replaced in the event of a problem such as a damage of the design surface, it is not necessary to interrupt production and send the molding tool for repair as before.

Further, since this mold part for resin molding is structured to be attachable to and detachable from the molding tool and made of the heat resistant material, there are more options for post-processings performed on the surface of the design section for the purpose of improving mold releasability. In this case, mold release coating, antifouling coating can be easily performed. Further, it is also possible to perform coating or the like on the premise of high-temperature sintering, the application of which to conventional molding tools has been difficult. Fluororesin-based coating, silicone resin-based coating, glass coating and the like can be applied as a coating example.

Particularly, in the mold part for resin molding according to the second aspect, the design section arranged on the one principal surface of the base material layer and on the product surface side has the design surface transferred by the reverse master having the uneven surface. Thus, for example, as compared with an uneven surface formed by etching, its shape is very sophisticated. Further, according to this mold part for resin molding, surface texturing can be performed on a molding tool made of a material with which surface texturing by etching has been conventionally difficult such as a molding tool fabricated, for example, by stereolithography.

Particularly, since the design section is mainly supported/reinforced by the reinforcement layer in the mold part for resin molding according to the third aspect, the strength of the design section is particularly reinforced/complemented. This reinforcement layer also has a function of reinforcing/complementing the strength of the uneven sections at the side opposite to the design section.

Particularly, in the mold part for resin molding according to the fourth aspect, the mold part for resin molding is interchangeably attached to the vacuum molding tool including the vacuum suction holes. In this case, the uneven sections including the recesses communicating with each other form the ventilation sections between the uneven sections and the inner surface of the molding tool and the ventilation sections communicate with the vacuum suction holes of the vacuum molding tool, and communicate with the through holes for vacuum suction penetrating through the mold part for resin molding. Thus, it is not necessary to perforate the above through holes for vacuum suction in this mold part for resin molding while aiming at vacuum suction holes provided in the vacuum molding tool as the installation partner from the beginning as before. Further, since this mold part for resin molding can be easily handled as a single part attachable to and detachable from the molding tool, a perforating operation for the through holes can be easily performed without being performed in an impossible posture unlike the conventional technology disclosed in patent literature 2.

That is, in the case of using this mold part for resin molding as a part of a vacuum molding tool, this mold part for resin molding can be easily used by being fitted into the vacuum molding tool after perforating the through holes for vacuum suction in the mold part for resin molding. Thus, an easier perforating operation is possible than an operation of perforating the through holes for vacuum suction in a surface-textured resin layer attached to the molding tool like the conventional technologies disclosed such as in patent literatures 1, 2.

Further, in this mold part for resin molding, the ventilation sections are decompressed at the time of molding to slow a cooling rate of a molding resin, more precisely transfer the design surface by the reverse master and, in addition, reduce poor appearance. When the molding is finished, a cooling gas is blown into the ventilation sections, whereby a molded article is instantaneously cooled and productivity is increased.

Particularly, in the mold part for resin molding according to the fifth aspect, heating heaters or heating tubes as an example of the heating means and/or cooling tubes as an example of the cooling means can be easily embedded in the mold part for resin molding by building the heating means and/or the cooling means in the base material layer or the reinforcement layer along the mold surface of the molding tool. As compared with that, conventional molding tools have a complicated structure which requires a huge amount of effort such as fabrication of the molding tool in a divided manner to provide heating tubes and/or cooling tubes along a mold surface of the molding tool.

A sixth aspect of the present invention is directed to a manufacturing method for a mold part for resin molding which is to be interchangeably attached to a molding tool and mold a resin molded article formed with a design on a product surface side, comprising a step of forming a base material layer; a step of forming a design section on a surface which is on one principal surface side of the base material layer and becomes the product surface side; and a step of forming uneven sections, which form ventilation sections between the uneven sections and the inner surface of the molding tool, on a surface located on the other principal surface side of the base material layer and to be held in contact with an inner surface of the molding tool; wherein at least the design section out of the base material layer and the design section is formed of a heat resistant material.

A seventh aspect of the present invention is an invention dependent on the invention according to the sixth aspect and a manufacturing method for a mold part for resin molding, comprising a step of preparing a mold for molding the resin molded article (mold preparation step); a step of preparing a reverse master formed of a flexible material and having an uneven surface as a transfer surface for forming a design surface of a product surface (reverse master preparation step); a step of forming a composite layer including a base material layer and a design section, which is arranged on one principal surface side of the base material layer and on the transfer surface side and becomes a design section on the product surface side, on a surface of the reverse master using the mold (composite layer formation step); a step of separating the reverse master from a laminated body (reverse master separation step); and a step of forming uneven sections on the other principal surface side of the base material layer (uneven section formation step).

An eighth aspect of the present invention is an invention dependent on the invention according to the seventh aspect and a manufacturing method for a mold part for resin molding, wherein the mold includes a master mold for the resin molded article; and the manufacturing method comprises a step of preparing the master mold for the resin molded article (master mold preparation step); a step of preparing a reverse master made of a flexible material and having an uneven surface as a transfer surface for forming a design surface of the product surface (reverse master preparation step); a step of impressing the shape of the master mold by attaching and temporarily fixing a surface opposite to the transfer surface along a surface of the master mold (impression step); a step of applying a heat resistant material to a surface of the transfer surface of the reverse master temporarily fixed to the master mold and forming a composite layer including a base material layer and a design section, which is arranged on one principal surface of the base material layer and on the transfer surface side and becomes the product surface side, on a surface of the reverse master (composite layer formation step); a step of removing the master mold from the reverse master (removal step); a step of separating the reverse master from the composite layer after the removal step (reverse master separation step); and a step of forming uneven sections on the other principal surface of the base material layer (uneven section formation step).

A ninth aspect of the present invention is an invention dependent on the invention according to the seventh aspect and a manufacturing method for a mold part for resin molding, wherein the mold includes an injection mold including a male mold, which serves as a master mold for the resin molded article, and a female mold; and the manufacturing method comprises a step of preparing the male mold (male mold preparation step); a step of preparing a reverse master made of a flexible material and having an uneven surface as a transfer surface for forming a design surface of the product surface (reverse master preparation step); a step of impressing the shape of the male mold by attaching and temporarily fixing a surface opposite to the transfer surface along a surface of the male mold (impression step); a step of arranging, on a surface of the reverse master, the female mold to face the male mold while being spaced apart from the male mold by a predetermined distance; a step of pouring a heat resistant material into a clearance between the male mold and the female mold and forming a composite layer including a base material layer and a design section, which is arranged on one principal surface of the base material layer and on the transfer surface side and becomes the product surface side, on a surface of the transfer surface of the reverse master temporarily fixed to the male mold (composite layer formation step); a step of removing the female mold from the composite layer (female mold removal step); a step of removing the male mold from the composite layer (male mold removal step); a step of separating the reverse master from the composite layer (reverse master separation step); and a step of forming uneven sections on the other principal surface of the base material layer.

A tenth aspect of the present invention is an invention dependent on the invention according to any one of the sixth to ninth aspects and a manufacturing method for a mold part for resin molding, further comprising a step of forming a reinforcement layer for supporting and reinforcing the design section (reinforcement layer formation step).

An eleventh aspect of the present invention is an invention dependent on the invention according to any one of the sixth to tenth aspects and a manufacturing method for a mold part for resin molding, further comprising a step of forming the mold part for resin molding with through holes penetrating through the mold part for resin molding in a thickness direction (through hole formation step).

Effect of Invention

According to the mold part for resin molding and the manufacturing method therefor according to the present invention, there is an effect that a design on a product surface side can be easily changed without requiring substantial effort and cost, the selection of post-processings on this design surface is diversified and the mold part is preferably attached to various molding tools.

The above object, other objects, features and advantages of the present invention will become more apparent from the description of the following embodiments of the invention with reference to drawings.

Figure 1:
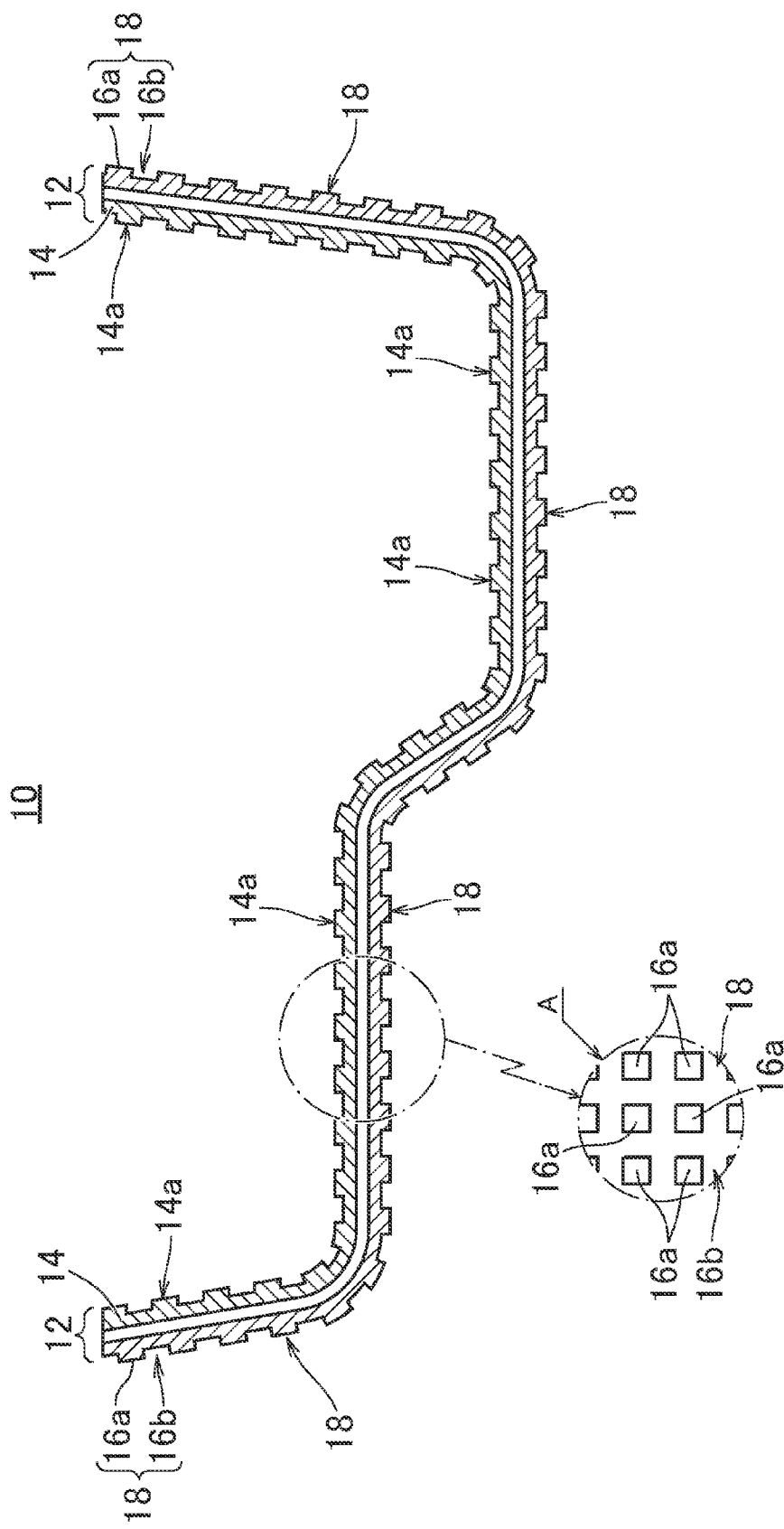
FIG. 1 is a sectional diagram showing an example of an embodiment of a mold part for resin molding according to the present invention.

LIST OF REFERENCE SIGNS 10 mold part for resin molding (mold part)
12 base material layer
14 design section
14a decoration section
16a, 30a, 40a, 50a projection
16b, 30b, 40b, 50b recess
18, 30, 42, 52 uneven section
20 ventilation section
21, 34, 44, 54 through hole
22 reverse master
24 composite layer
26 reinforcement layer
28 reverse resin sheet body
28a uneven surface
32, 38, 56 support frame 36 net
48 cooling tube
100 master mold
110 male mold
120 female mold
M molding tool
m inner surface of molding tool
h vacuum suction hole of vacuum molding tool

DETAILED DESCRIPTION OF THE INVENTION

Figure 2:
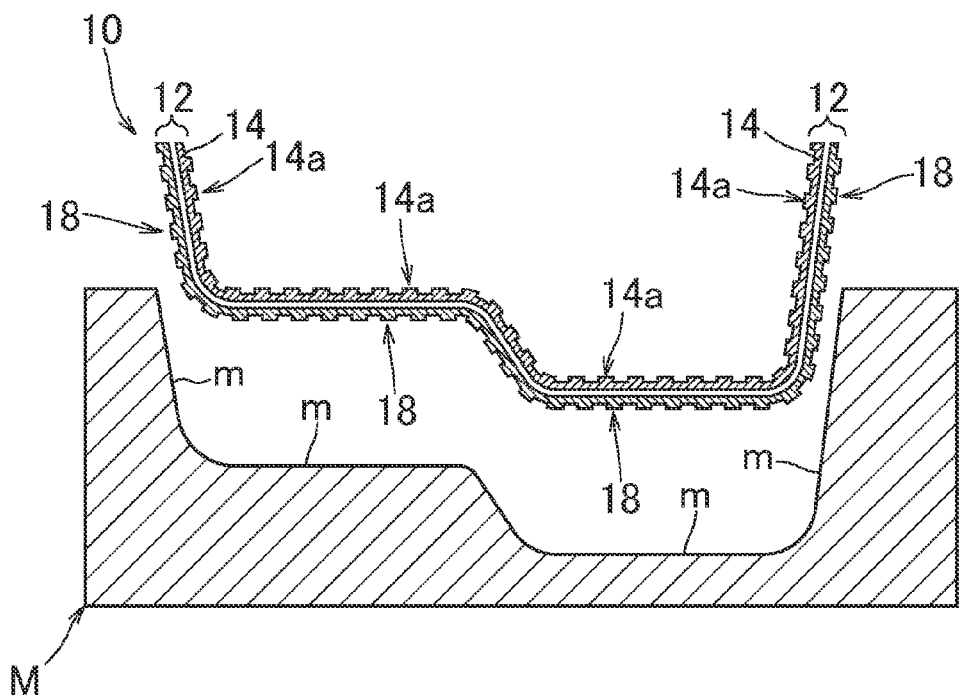
FIG. 2 is an exploded sectional view showing a state where the mold part for resin molding of FIG. 1 is interchangeably attached to a molding tool.
Figure 3:
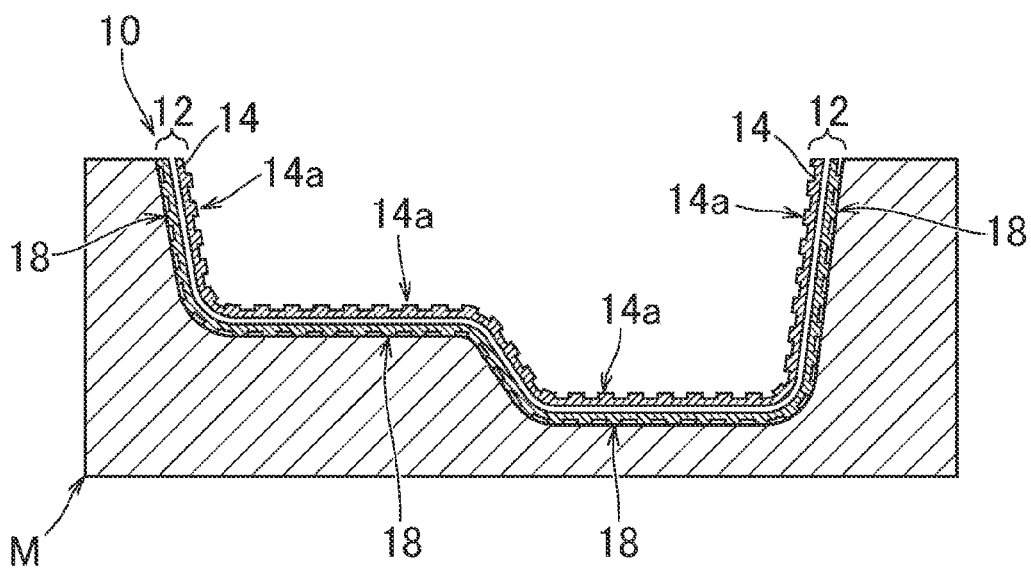
FIG. 3 is a sectional view showing a state where the mold part for resin molding of FIG. 1 is attached to a mold surface of the molding tool.
Figure 4:
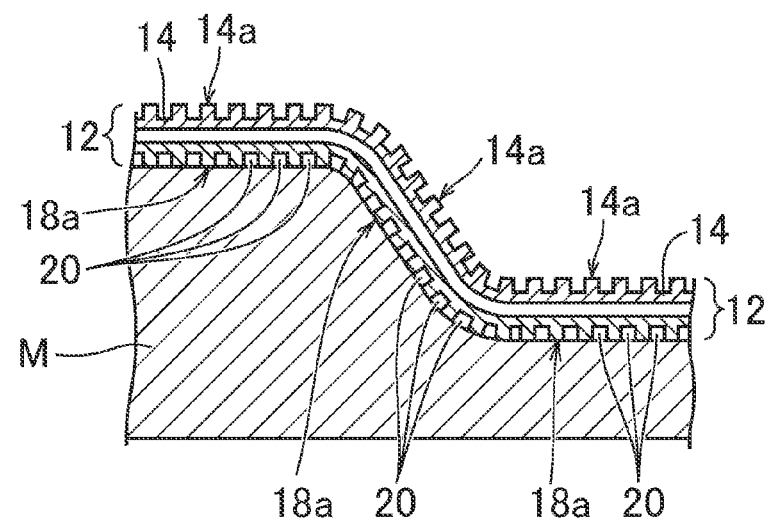
FIG. 4 is an enlarged view showing an essential part of FIG. 3.
Figure 5:
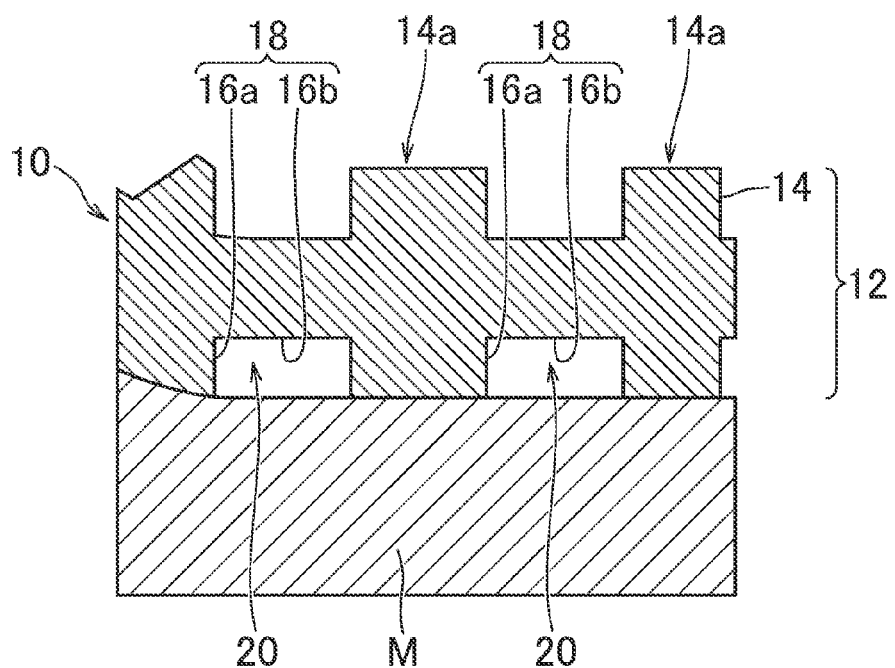
FIG. 5 is an enlarged view showing an essential part of FIG. 4.

FIG. 1 is a sectional diagram showing an example of an embodiment of a mold part for resin molding according to the present invention, and FIG. 2 is an exploded sectional view showing a state where the mold part for resin molding of FIG. 1 is interchangeably attached to a molding tool. FIG. 3 is a sectional view showing a state where the mold part for resin molding of FIG. 1 is attached to a mold surface of the molding tool. FIG. 4 is an enlarged view showing an essential part of FIG. 3, and FIG. 5 is an enlarged view showing an essential part of FIG. 4.

A mold part for resin molding 10 is used by being interchangeably attached to a molding tool for manufacturing a resin molded article including, on a surface side thereof, decoration sections such as a surface texture pattern (leather surface texture pattern, fine texture pattern, woodgrain pattern, pearskin pattern, leaf vein pattern, scale pattern, marble pattern, coating pattern, geometric pattern, etc.) to improve the design of a molded article which becomes a product. [see, for example, FIGS. 2 and 3.]

The mold part for resin molding 10 (hereinafter, referred to as the "mold part 10") includes a base material layer 12 as shown in FIG. 1. A design section 14 is formed on a surface which is on one principal surface side of the base material layer 12 and becomes a product surface side. The design section 14 includes decoration sections 14a such as a surface texture pattern (leather surface texture pattern, fine texture pattern, woodgrain pattern, pearskin pattern, leaf vein pattern, scale pattern, marble pattern, coating pattern, geometric pattern, etc.).

In this embodiment, the decoration sections 14a include a design surface formed by a fine uneven surface texture pattern transferred by a reverse master having a fine uneven surface. The reverse master is formed of a ductile, tractile and flexible material capable of transferring, for example, a surface texture pattern having a thickness of about 0.1 to 1000 μm to a surface side of the design section 14. The design surface of the design section 14 which becomes a product molded surface of the mold part 10 is made of a material with which a desired uneven surface texture pattern is parted at the time of molding.

The design section 14 may include mirrored sections (not shown) which can be formed on surfaces of the decoration sections 14a by surface processing such as glass coating.

Uneven sections 18 including a plurality of projections 16a and recesses 16b are formed on the other principal surface side of the base material layer 12. For example, as shown in FIGS. 2, 3 and 4, the uneven sections 18 are formed on a surface to be held in contact with an inner surface m of a molding tool M. As shown in a part of an arrow A enclosed by dashed-dotted line in FIG. 1, a plurality of projections 16a and recesses 16b of the uneven sections 18 are arranged, for example, in a grid-like manner in a plan view. The plurality of recesses 16b of the uneven sections 18 communicate with each other. Thus, when the mold part 10 is fitted and attached along the inner surface m of the molding tool M, ventilation sections 20 communicating between the uneven sections 18 and the inner surface m of the molding tool M are arranged, for example, as shown in FIGS. 4 and 5.

In this embodiment, the base material layer 12, the design section 14 and the uneven sections 18 are formed of a heat resistant material and the mold part 10 including the base material layer 12, the design section 14 and the uneven sections 18 is formed to be thin. This mold part 10 including the base material layer 12, the design section 14 and the uneven sections 18 is formed to have a thin thickness of, e.g. about 3 to 30 nm. In this case, the decoration sections (design surface) 14a of the design section 14 are formed to have a thickness of about 1 mm and a surface texture pattern of the decoration sections (design surface) 14a formed on a surface of the design section 14 is formed such that the "height of surface texture projections" and the "depth of surface texture recesses" thereof are, for example, about 0.1 to 1000 μm. Further, the depth of the recesses 16b of the uneven sections 18 is, for example, about 0.01 to 1000 μm and distances between each projection 16a are, for example, about 10 to 1000 μm.

The mold part 10 according to this embodiment can be configured to further include a reinforcement layer (not shown in FIGS. 1 to 6) for supporting/reinforcing the design section 14 of the base material layer 12 and it is more preferable to include this reinforcement layer. As a method for forming this reinforcement layer, it is possible to adopt a method for providing a glass cloth in the base material layer 12, a method for thickening the mold part 10 including the base material layer 12, the design section 14 and the uneven sections 18 using a heat resistant material and a method for providing any one of or a plurality of heat resistant resin material, fiber material, ceramic material and metal material in the base material layer 12. This reinforcement layer also has a function of reinforcing/complementing the strength of the uneven sections 18 at a side opposite to the design section 14.

Since the mold part 10 according to this embodiment is formed to be thin and light by the heat resistant material and the mold part 10 itself is suitable to be singly handled, it can be interchangeably easily attached to the molding tool M so that a molding pressure acts in a direction to press the above uneven sections 18 against the inner surface m of the molding tool M at the time of molding a resin molded article, for example, as shown in FIGS. 2 and 3. The mold part 10 has strength to be attachable to and detachable from the mold part M, has a pressure capacity to withstand a molding pressure acting on this mold part 10 at the time of molding in a state attached to the molding tool M, and has strength to be able to mass-produce resin molded articles.

The mold part 10 according to this embodiment can be formed of any one of or a plurality of heat resistant resin material, fiber material, ceramic material and metal material. In this embodiment, the base material layer 12, the design section 14 and the uneven sections 18 configuring the mold part 10 can be formed of a curable resin material that is cured at a normal temperature, upon being heated, upon light irradiation or the like, a ceramic, a metal simple substance, a sintered compact of metal powder and a sprayed coating or a composite material in which fibers or particulates are mixed in any of the above materials.

Epoxy resin, acrylic resin, polyacetal resin, polyamide resin, polyimide resin, polyurethane resin, polyester resin, polyethylene resin, polycarbonate resin, polypropylene resin, silicon resin, fluororesin, melamine resin, urea resin, phenol resin, phthalate-based resin, styrol-based resin, cellulose-based resin, vinyl chloride resin, vinyl acetate resin and other resins may be singly used or two or more of them may be mixed and used as the above resin material.

A porcelain material, glass, cement, plaster, enamel, fine ceramic or the like can be used as the above ceramic material.

An organic fiber material such as polyamide fibers (aramid fibers and Kevlar fibers) or an inorganic fiber material such as glass fibers, carbon fibers and silicon carbide fibers is used as the above fiber material. In the case of mixing these fiber materials into the resin material, it is preferable to use short fibers having a length of, e.g. about 10 to 300 µm.

Particulates made of a ceramic material or a metal material are used as the above particulates, and it is preferable to use particulates having a diameter of, e.g. about 10 to 300 µm.

In this embodiment, the reinforcement layer may be formed of any one of the above resin material, ceramic material, fiber material and particulate material or a composite material of a plurality of materials.

Since the mold part 10 according to the above embodiment is configured to be attachable to and detachable from the molding tool M as shown in FIGS. 2 and 3, a design section formed on a product surface side can be easily changed without re-fabricating the molding tool M every time. Thus, substantial effort and cost for fabricating various types of molding tools M corresponding to different product designs can be reduced.

Since this mold part 10 is formed of the heat resistant material and can be handled as a single part, and the molding tool M has physicality, particularly, for example, a mechanical property and a thermal property, which withstands a predetermined molding method when the mold part 10 is attached to the molding tool M, even if this mold part 10 does not have this physicality as a single part, this mold part 10 can withstand a molding pressure acting at the time of molding in a state fitted in the molding tool M as an installation partner. Accordingly, this mold part 10 can be detachably attached to various molding tools M regardless of the type of the mating molding tool M to which the mold part 10 is interchangeably attached, i.e. the type of the molding method and the material of the molding tool M, and has high versatility. In this case, various molding tools such as a vacuum molding tool, an injection molding tool, a compression molding tool, an extrusion molding tool, a blow molding tool can be applied as the molding tool M as the installation partner of this mold part 10. Further, the material of the molding tool M can be applied for molding tools made of various materials such as a metal, a resin, a composite material and a woody material and for simple molding tools made of a material with insufficient durability for the use in mass-production molding.

Further, particularly since the design section 14 to be arranged on the one principal surface of the base material layer 12 and on the product surface side has the design surface transferred by the reverse master having the uneven surface in the mold part 10 according to this embodiment, the shape of this design surface is very sophisticated as compared with an uneven surface formed, for example, by etching. Further, according to this mold part 10, surface texturing can be easily performed on a molding tool made of a material with which surface texturing by etching has been conventionally difficult such as a molding tool fabricated, for example, by stereolithography.

Further, the uneven sections 18 formed on the other principal surface of the base material layer 12 to be held in contact with the inner surface m of the molding tool M form the ventilation sections 20 between the uneven sections 18 and the inner surface m of the molding tool M, for example, as shown in FIGS. 4 and 5. Therefore, the ventilation sections 20 are decompressed at the time of molding to slow a cooling rate of a molding resin, enabling the design surface to be more precisely transferred by the reverse master and enabling a reduction in the incidence of poor appearance when this mold part 10 is applied, for example, to an injection molding tool. Further, when the molding is finished, a cooling gas is blown into the ventilation sections 20, whereby a resin molded article is instantaneously cooled and productivity is increased. In this case, the recesses 16b of the uneven sections 18 may or may not be formed to communicate with each other.

Since this mold part 10 can be handled as a single part as described above, it can be detached and easily cleaned, for example, when being tainted by gas burning at the time of molding a resin molded article. Further, since this mold part 10 can be replaced in the event of a problem such as a damage of the design surface, it is not necessary to interrupt production and send the molding tool for repair as before.

Further, since this mold part 10 is structured to be attachable to and detachable from the molding tool M and made of the heat resistant material, there are more options for post-processings performed on the surface of the design section for the purpose of improving mold releasability. In this case, mold release coating, antifouling coating can be easily performed. Further, it is also possible to perform post-processing such as coating on the premise of high-temperature sintering, the application of which to conventional molding tools M has been difficult. Fluororesin-based coating, silicone resin-based coating, glass coating and the like can be applied as a coating example.

Figure 6:
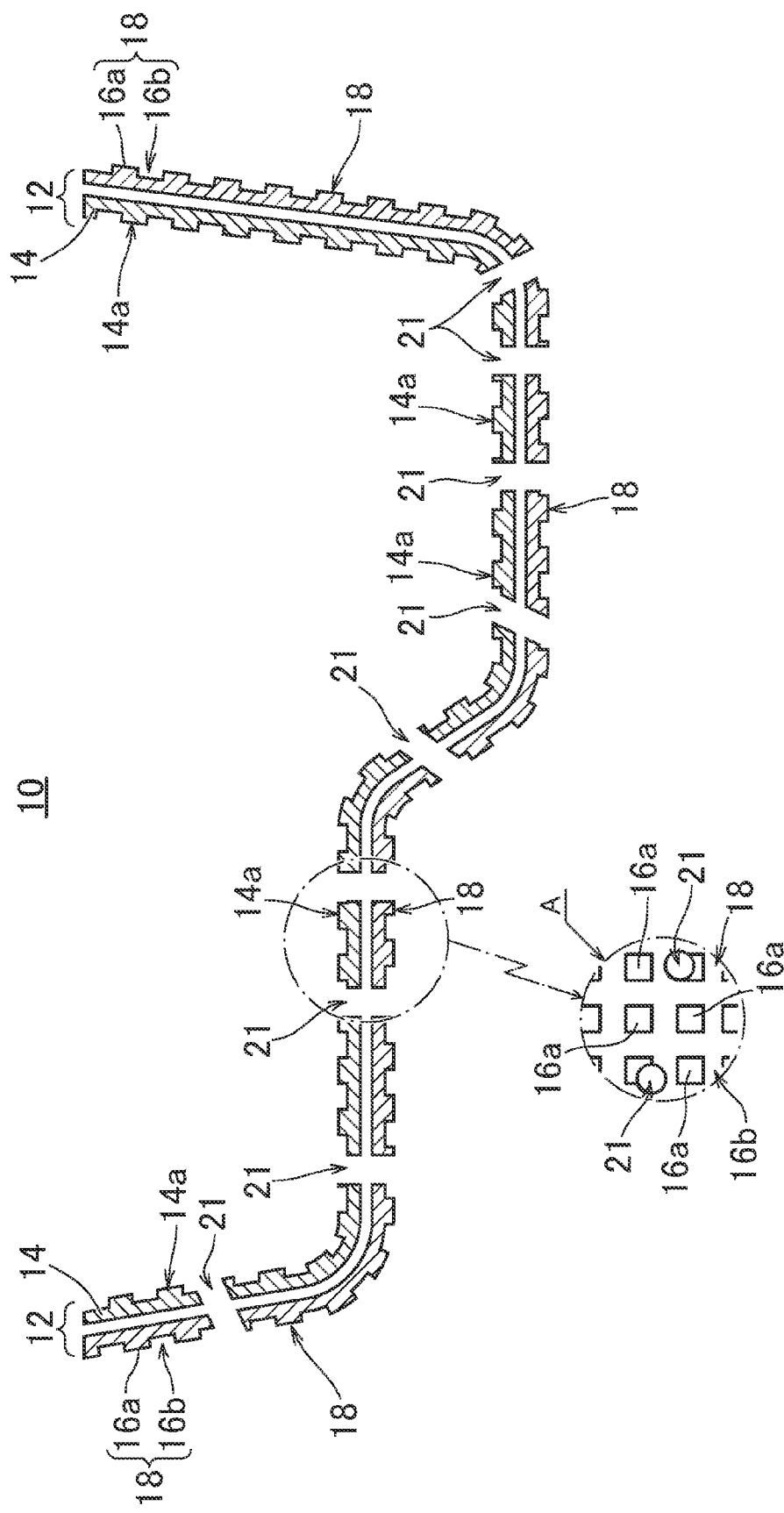
FIG. 6 is a sectional view showing another embodiment of the mold part for resin molding according to the present invention.
Figure 7:
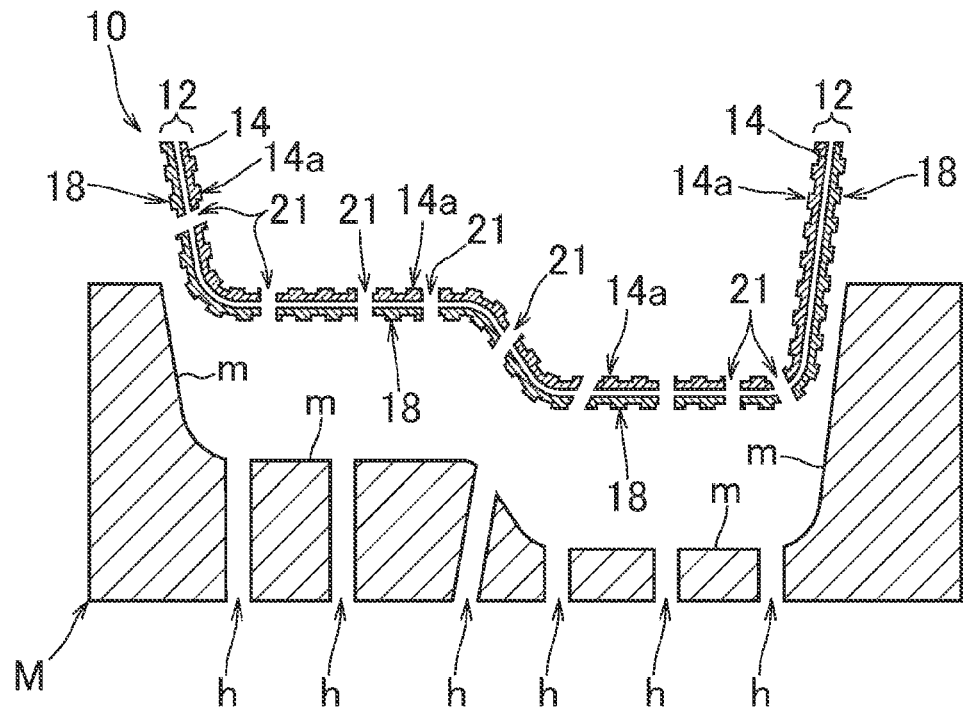
FIG. 7 is an exploded sectional view showing a state where the mold part for resin molding of FIG. 6 is interchangeably attached to a molding tool.
Figure 8:
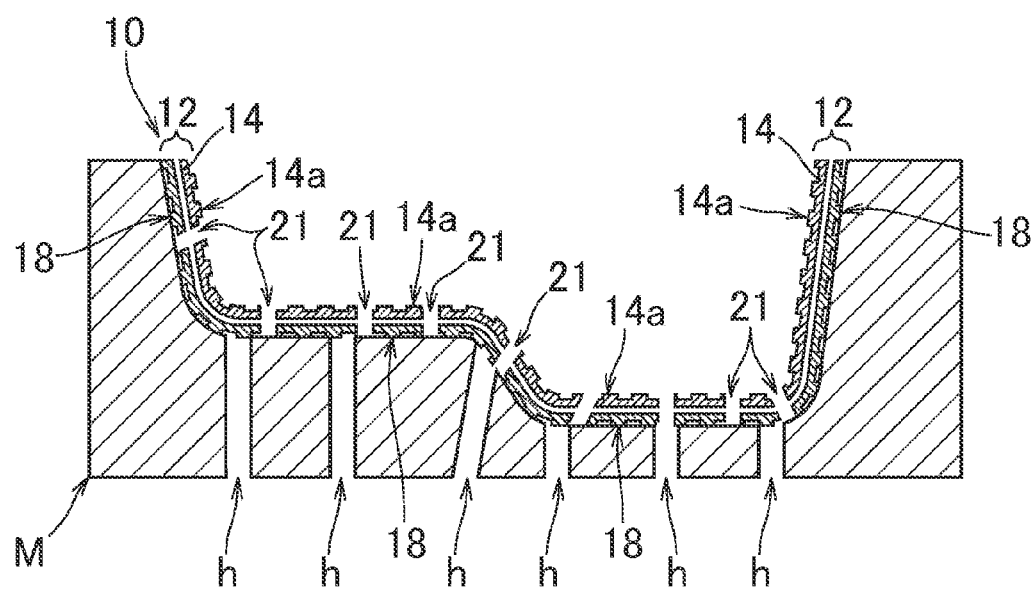
FIG. 8 is a sectional view showing a state where the mold part for resin molding of FIG. 6 is attached to a mold surface of the molding tool.
Figure 9:
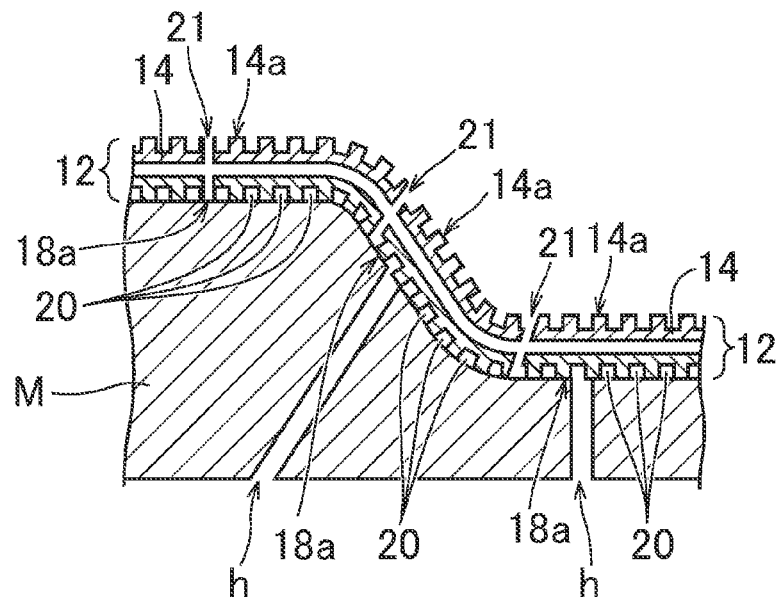
FIG. 9 is an enlarged view showing an essential part of FIG. 8.
Figure 10:
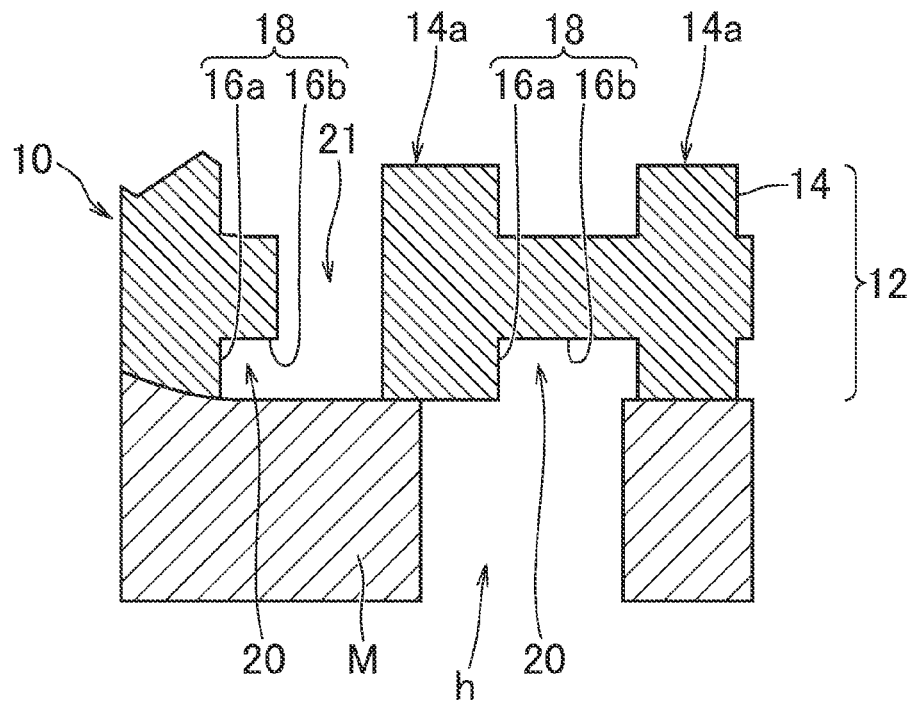
FIG. 10 is an enlarged view showing an essential part of FIG. 9.

FIG. 6 is a sectional view showing another embodiment of the mold part for resin molding according to the present invention, and FIG. 7 is an exploded sectional view showing a state where the mold part for resin molding of FIG. 6 is interchangeably attached to a molding tool. FIG. 8 is a sectional view showing a state where the mold part for resin molding of FIG. 6 is attached to a mold surface of the molding tool. FIG. 9 is an enlarged view showing an essential part of FIG. 8, and FIG. 10 is an enlarged view showing an essential part of FIG. 9.

A molding tool 10 according to this embodiment differs from the above embodiment in including through holes 21 penetrating through the molding tool 10 in a thickness direction. That is, a plurality of through holes 21 penetrating through a base material layer 12, a design section 14 and uneven sections 18 are arranged in the mold part 10 according to the embodiment shown in FIGS. 6 to 10. The through holes 21 are formed in this mold part 10 to have a cylindrical shape having a diameter of, e.g. 150 to 220 µm. The through holes 21 may be formed to have a truncated conical cross-sectional shape so that a hole diameter is gradually widened toward the molding tool M that is an installation partner.

The through holes 21 are arranged by a perforation method for cutting through holes by a drill or the like, a perforation method for heating and melting the base material layer 12, the design section 14 and the uneven sections 18 by laser, or a method in which wire materials such as piano wires are embedded to have a desired hole diameter to secure through hole parts when a heat resistant resin material or the like is half cured during the fabrication of the mold part 10, and the through holes 21 are formed by removing the wire materials or letting them disappear after or while the resin material is so cured that the resin material and the like do not spread to the parts where the through holes 21 are to be formed.

The molding tool 10 according to this embodiment is interchangeably fitted and attached to a vacuum molding tool M including vacuum suction holes h, for example, as shown in FIGS. 7 and 8. Since this mold part 10 can be easily singly handled, the through holes 21 can be perforated at arbitrary positions as appropriate. Further, that perforating operation needs not be performed in an impossible posture unlike the conventional technology disclosed in patent literature 2. Note that if the initially perforated through holes 21 are clogged with chips, the mold part 10 may be appropriately detached from the molding tool M as the installation partner and cleaned or through holes 21 may be perforated at other positions of the molding tool 10.

That is, in the case of using this mold part 10 as a part of the vacuum molding tool M, this mold part 10 can be fitted into the vacuum molding tool M and easily used after the through holes 21 for vacuum suction are perforated in this mold part 10. Thus, the perforating operation is easier than an operation of perforating the through holes for vacuum suction in a surface-textured resin layer bonded to a molding tool as in the conventional technologies disclosed such as in patent literature 1, 2.

In this embodiment, when this mold part 10 is attached to the vacuum molding tool M, the uneven sections 18 of the mold part 10 come into contact with the inner surface m of the vacuum molding tool M and ventilation sections 20 are arranged between the uneven sections 18 of this mold part 10 and the inner surface m of the vacuum molding tool M and communicate with the above through holes 21 as shown in FIGS. 8, 9 and 10. Thus, in this embodiment, it is not necessary to perforate the through holes 21 for vacuum suction while aiming at vacuum suction holes h provided in the vacuum molding tool M as the installation partner from the beginning.

Further, in this embodiment, the ventilation sections 20 of this molding tool 10 are decompressed at the time of molding, whereby a cooling rate of a molding resin is slowed, a design surface can be more precisely transferred by a reverse master and the incidence of poor appearance can be reduced. Further, when the molding is finished, a cooling gas is blown into the ventilation sections 20, whereby a resin molded article is instantaneously cooled and productivity can be increased.

Figure 11:
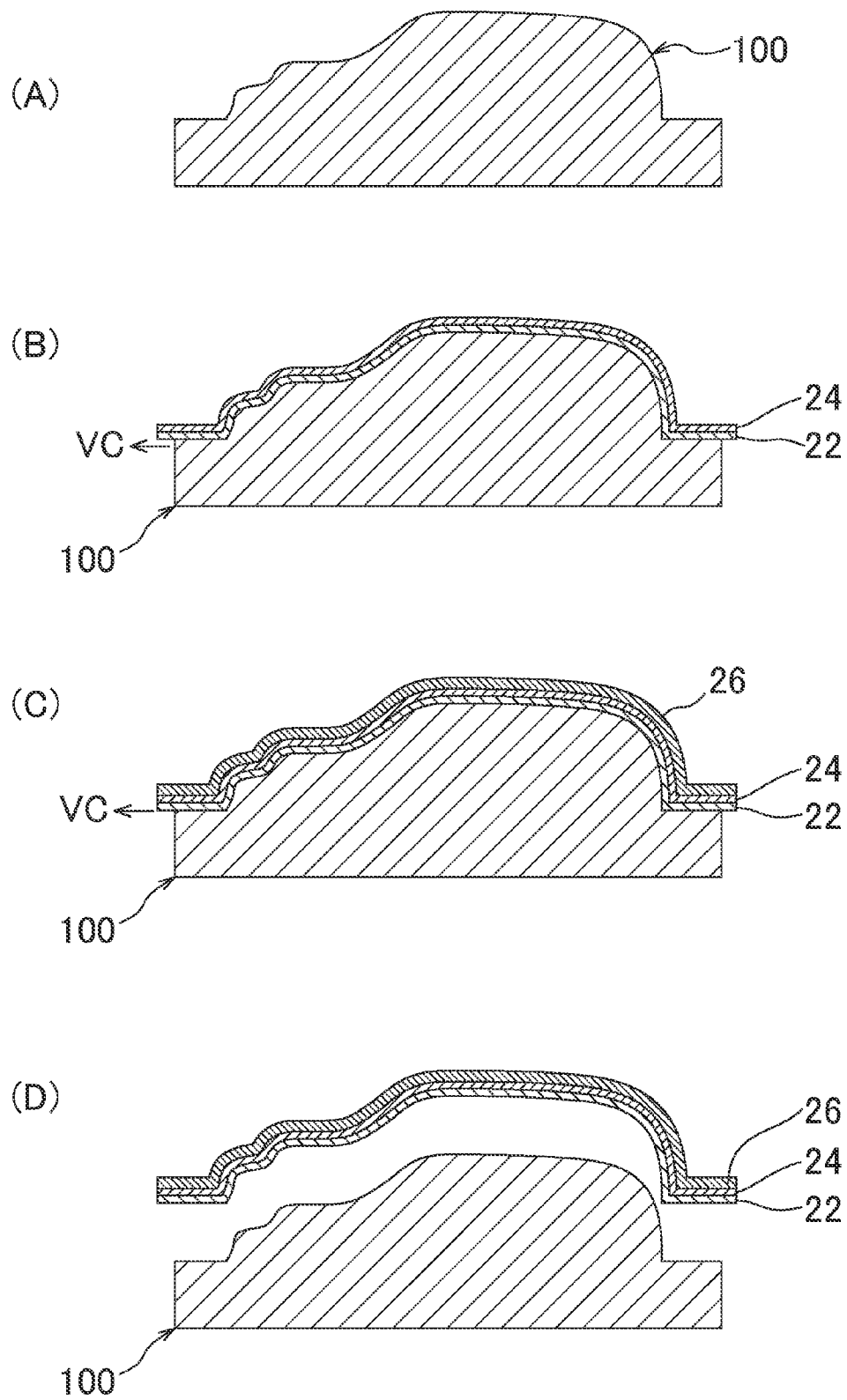
FIG. 11 is a process diagram showing essential parts showing an example of a manufacturing method for the mold part for resin molding according to the embodiment of the present invention, wherein (A) to (D) are sectional views showing essential parts of the manufacturing method.
Figure 12:
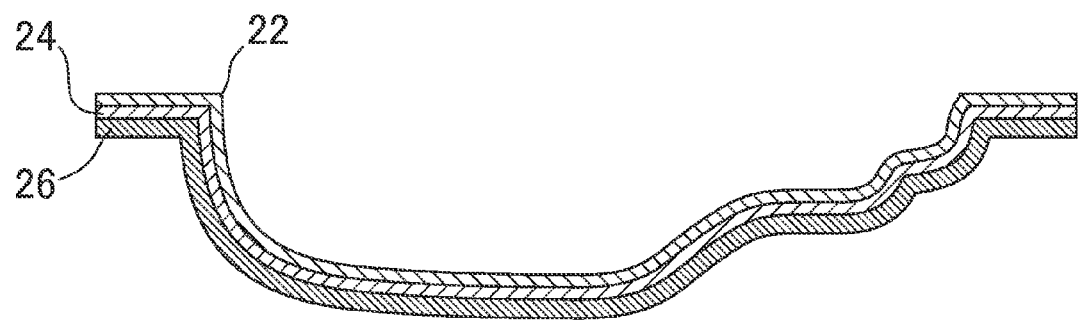
FIG. 12 is another process diagram showing essential parts showing an example of the manufacturing method for the mold part for resin molding according to the embodiment of the present invention, wherein (A), (B) are sectional views showing essential parts of the manufacturing method.
Figure 12:
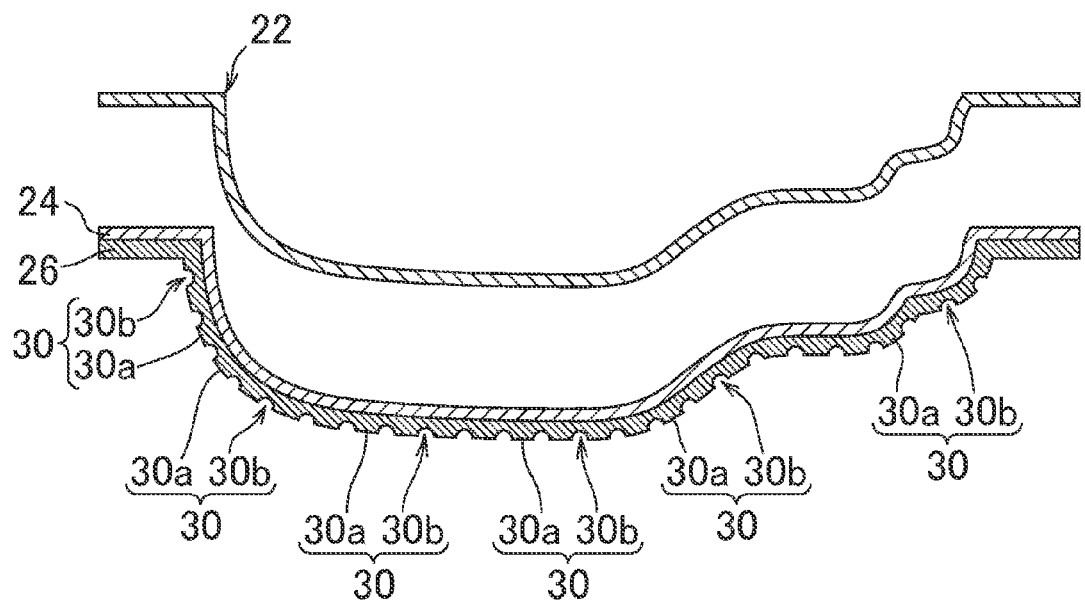
Figure 13:
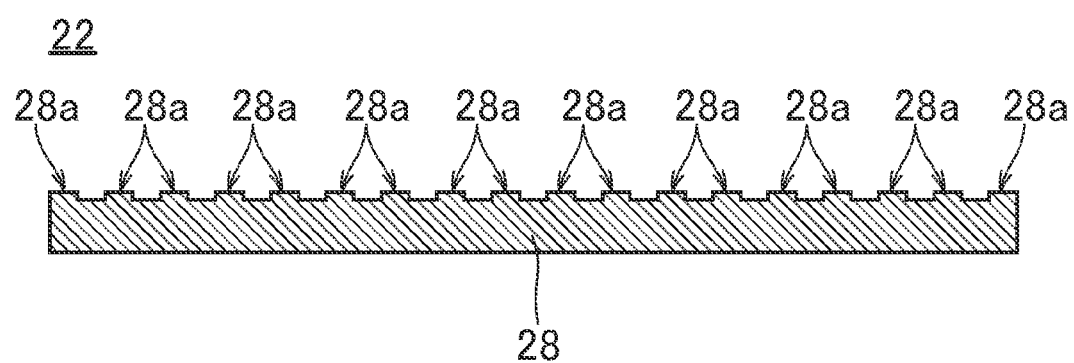
FIG. 13 is a sectional view showing an example of a reverse master used in the manufacturing methods shown in FIGS. 11 and 12.

FIG. 11 is a process diagram showing essential parts showing an example of a manufacturing method for the mold part for resin molding according to the embodiment of the present invention, wherein (A) to (D) are sectional views showing essential parts of that manufacturing method. FIG. 12 is another process diagram showing essential parts showing an example of the manufacturing method for the mold part for resin molding according to the embodiment of the present invention, wherein (A), (B) are sectional views showing essential parts of that manufacturing method. FIG. 13 is a sectional view showing an example of a reverse master used in the manufacturing methods shown in FIGS. 11 and 12.

This manufacturing method is a method for manufacturing a mold part for resin molding which is to be interchangeably attached to a molding tool and mold a resin molded article having a design on a product surface side, and includes the following steps (1) to (5).

(1) Mold Preparation Step

As shown in FIG. 11(A), a master mold 100 is prepared, for example, as a mold for molding a resin molded article. The master mold is formed of a resin material, a composite material, a plaster material, a woody material or the like. The master mold 100 is for fabricating the mold surface of the mold part 10, and this mold surface forms an outer shape of a resin molded part (product). The master mold 100 may be fabricated from CAD data or the like or may be fabricated by reversion.

(2) Reverse Master Preparation Step

For example, as shown in FIG. 13, the reverse master 22 includes a reverse resin sheet body 28 formed of a flexible material, e.g. a resin material, and an uneven surface 28a as a transfer surface for forming a design surface on a surface of the above resin molded article (product) is formed on a surface of the reverse resin sheet body 28.

(3) Impression Step

As shown in FIG. 11(B), the reverse master 22 has a flat surface opposite to the uneven surface 28a, which becomes the transfer surface, bonded along a surface of the master mold 100 to be temporarily fixed, whereby the shape of the master mold 100 is impressed. In this case, the reverse master 22 is held in close contact with the surface of the master mold 100 by a vacuum suction force (VC). The reverse master 22 may be bonded by adhesive.

(4) Composite Layer Formation Step

As shown in FIG. 11(B), a resin material or a composite material is, for example, applied as a heat resistant material to the surface of the transfer surface of the reverse master 22 temporarily fixed to the master mold 100, whereby a composite layer 24 including the above base material layer 12 and the design section 14, which is arranged on one principal surface of the base material layer 12 and on a transfer surface side and becomes a design on a product surface, is formed on the surface of the reverse master 22. In this case, the heat resistant material that becomes the composite layer 24 is applied, for example, by an application method such as brushing, hand coating or spraying or a method for laminating a half-cured sheet material or the like is formed on the surface of the reverse master 22.

(5) Reinforcement Layer Formation Step

As shown in FIG. 11(C), a reinforcement layer 26 for supporting and reinforcing the design section 14 is formed on a surface of the composite layer 24. In this case, the reinforcement layer 26 is formed by applying any one of or a plurality of heat resistant resin material, fiber material, ceramic material and metal material onto the surface of the composite layer 24 by the above application method or the like.

This reinforcement layer formation step may include a step of building a heating means and/or a cooling means in the base material layer 12 or the reinforcement layer 26 along the inner surface m of the above molding tool M, in the reinforcement layer 26.

In this case, a flexible surface heater (sheet heater) for heating as the heating means is, for example, embedded in the base material layer 12 or the reinforcement layer 26. This surface heater (sheet heater) is preferably formed to have a thickness of, e.g. about 3 mm or less. Besides the surface heater (sheet heater), tubes for heating (hereinafter, referred to as heating tubes) in which a heating fluid is passed may be embedded in the base material layer 12 or the reinforcement layer 26 as the heating means. The heating tubes are preferably formed to have a diameter of, e.g. about 3 to 30 mm.

Further, as the cooling means, tubes for cooling (hereinafter, referred to as cooling tubes) in which a cooling fluid is passed may be embedded in the base material layer 12 or the reinforcement layer 26. The cooling tubes are preferably formed to have a diameter of, e.g. about 3 to 30 mm.

To provide the heating tubes and/or the cooling tubes along the inner surface m of the molding tool M, the conventional molding tool M has a complicated structure which requires a huge amount of effort such as fabrication of the molding tool M in a divided manner. In comparison, the heating heater, the heating tubes and/or the cooling tubes can be easily embedded in the molding tool 10 along the inner surface m of the molding tool M by the above step of building the heating means and/or the cooling means.

(6) Removal Step

By removing the master mold 100 from a laminated body of the above composite layer 24, reinforcement layer 26 and reverse master 22, for example, as shown in FIG. 11(D), the laminated body of the composite layer 24, the reinforcement layer 26 and the reverse master 22 can be obtained.

(7) Reverse Master Separation Step

After the removal step, the composite layer 24 is obtained by separating the reverse master 22 from the above laminated body, for example, as shown in FIG. 12(A). Then, unnecessary parts of the composite layer 24 are trimmed (8) Uneven Section Formation Step The composite layer 24 is formed with uneven sections 30 including projections 30a and recesses 30b on the other principal surface (lower surface) of the base material layer 12. In this case, the uneven sections 30 composed of groove sections such as a surface texture pattern are formed by a method such as machining.

(9) When needed, the composite layer 24 is perforated with through holes [not shown in FIG. 12(B)]. In this case, the through holes are appropriately formed by drilling, laser processing or the like.

Example 1

Figure 14:
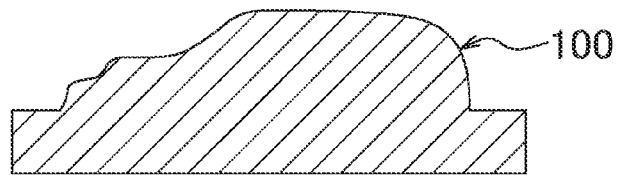
FIG. 14 is a process diagram showing essential parts showing an example of a manufacturing method of one example (Example 1) according to the present invention, wherein (A) to (E) are sectional views showing essential parts of the manufacturing method.
Figure 14:
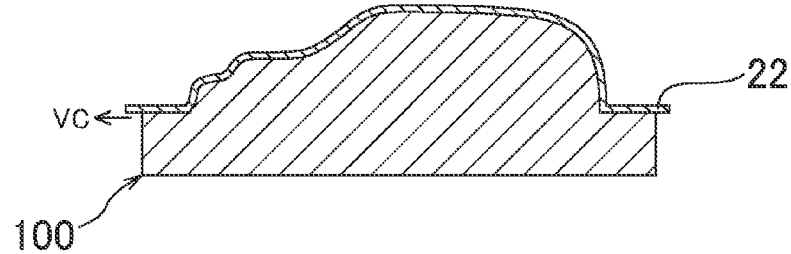
Figure 14:
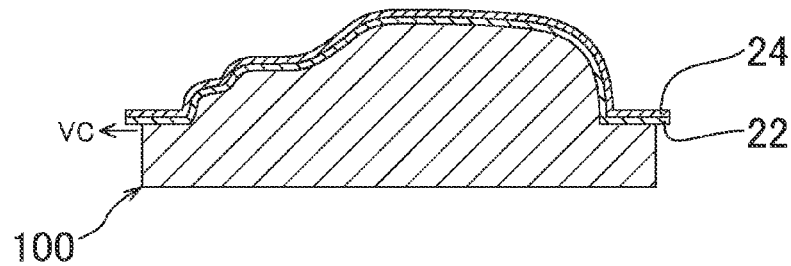
Figure 14:
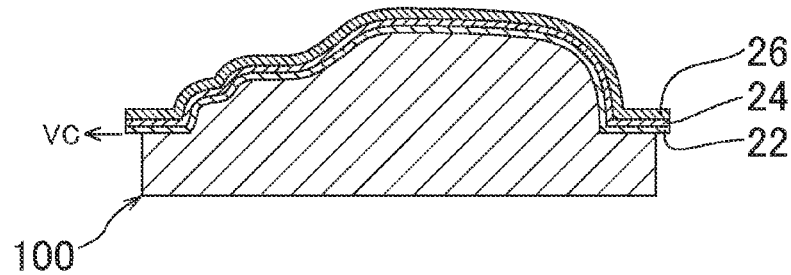
Figure 14:
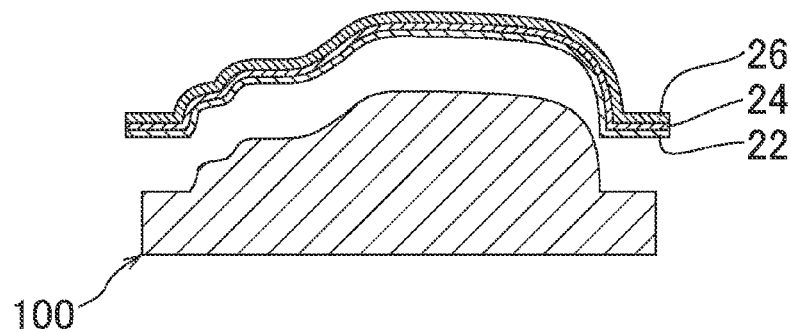
Figure 15:
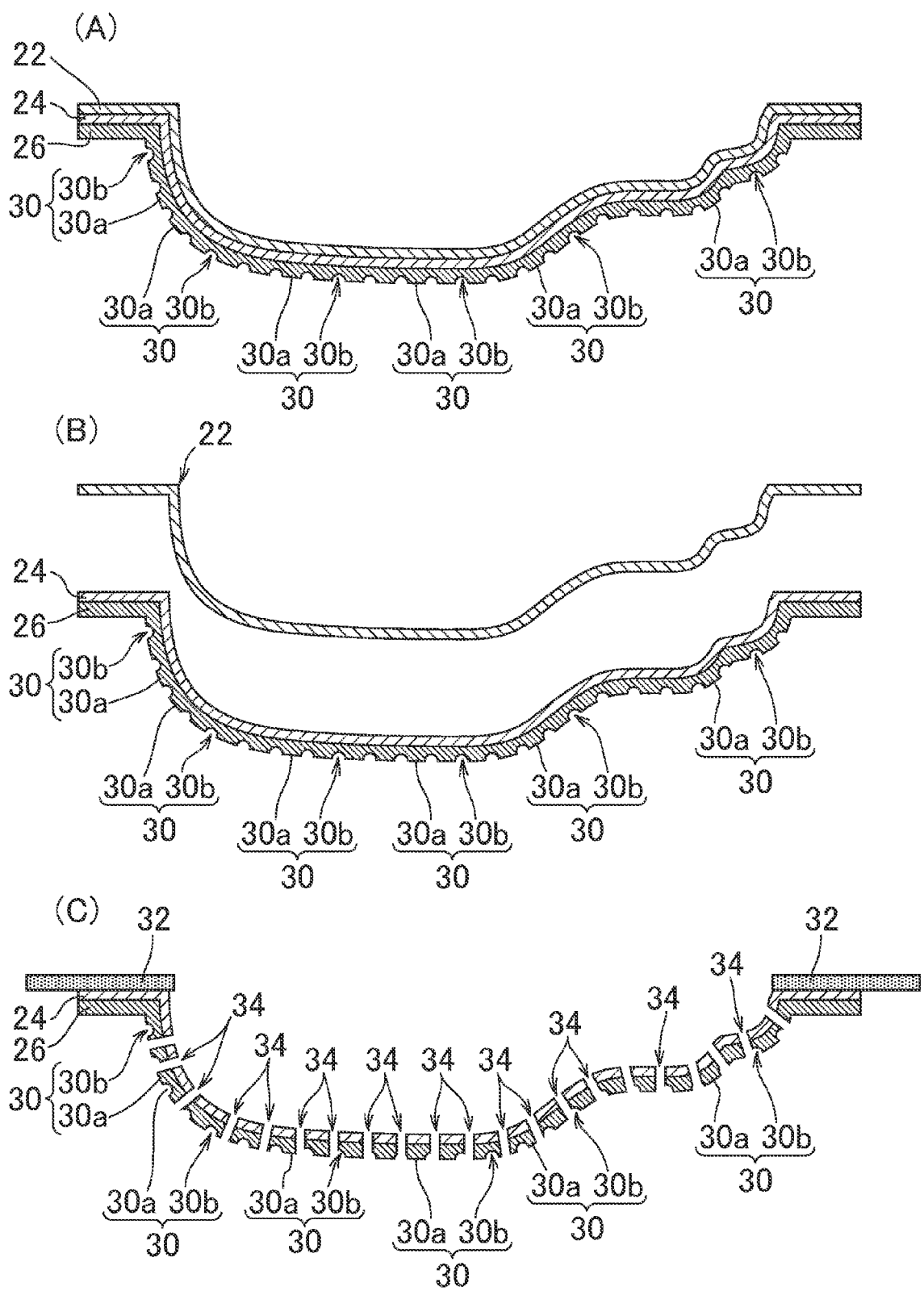
FIG. 15 is another process diagram showing essential parts showing the example of the manufacturing method of the one example (Example 1) according to the present invention, wherein (A) to (C) are sectional views showing essential parts of the manufacturing method.

FIG. 14 is a process diagram showing essential parts showing an example of a manufacturing method of one example (Example 1) according to the present invention, wherein (A) to (E) are sectional views showing essential parts of the manufacturing method. FIG. 15 is another process diagram showing essential parts showing the example of the manufacturing method of the one example (Example 1) according to the present invention, wherein (A) to (C) are sectional views showing essential parts of the manufacturing method.

(1) A master mold 100 for impression is prepared (master mold preparation step). [See FIG. 14(A)]

(2) A surface texture reverse master 22 having a thickness of 0.1 to 50 mm is placed on the master mold 100 by being manually attached using a vacuum suction force (impression step). [See FIG. 14(B)]

(3) A surface-textured composite layer 24 is formed by applying a heat resistant material onto the surface texture reverse master 22 to have a thickness of 3 to 30 mm (composite layer formation step). [See FIG. 14(C)]

(4) The reinforcement layer 26 having a thickness of 3 to 30 mm is formed on the heat resistant material (composite layer 24) (reinforcement layer formation step). [See FIG. 14(D)]

(5) Only the master mold 100 is detached (removal step). [See FIG. 14(E)]

(6) Unnecessary parts are trimmed and uneven sections 30 including projections 30a and recesses 30b are formed by engraving a surface texture pattern (grooves) for ventilation in the reinforcement layer 26, which becomes a surface to be held in contact with the molding tool, by machining (uneven section formation step). [See FIG. 15(A)]

(7) The surface texture reverse master 22 is separated (reverse master separation step). [See FIG. 15(B)]

(8) If necessary, the surface-textured composite layer 24 including the reinforcement layer 26 is provided with a metal frame 32 used for fitting into a molding tool and through holes 34 for vacuum suction having a diameter of 150 to 220 μm are perforated by a laser beam machine (through hole formation step). [See FIG. 15(C)]

Example 2

Figure 16:
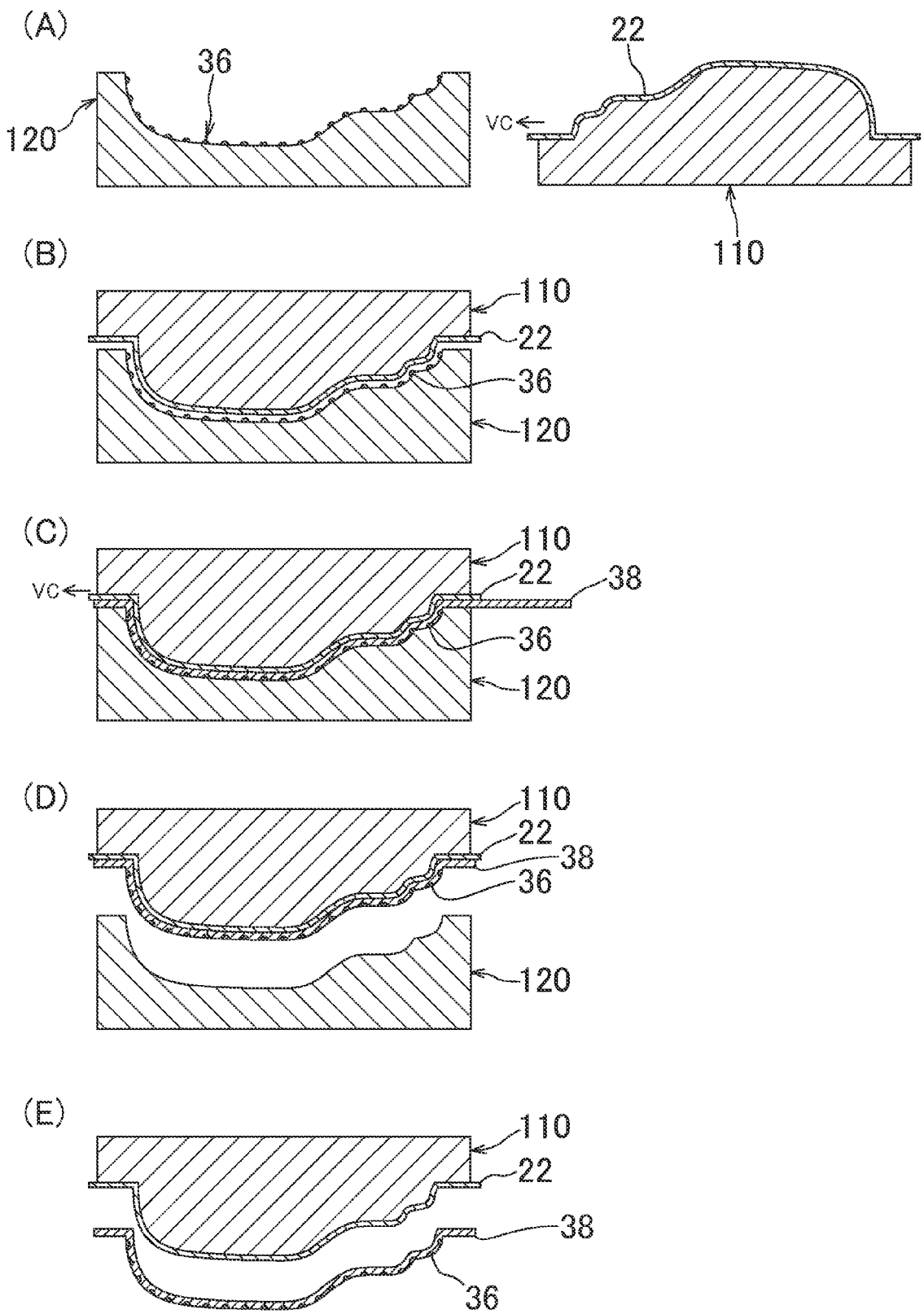
FIG. 16 is a process diagram showing essential parts showing an example of a manufacturing method of one example (Example 2) according to the present invention, wherein (A) to (E) are sectional views showing essential parts of the manufacturing method.
Figure 17:
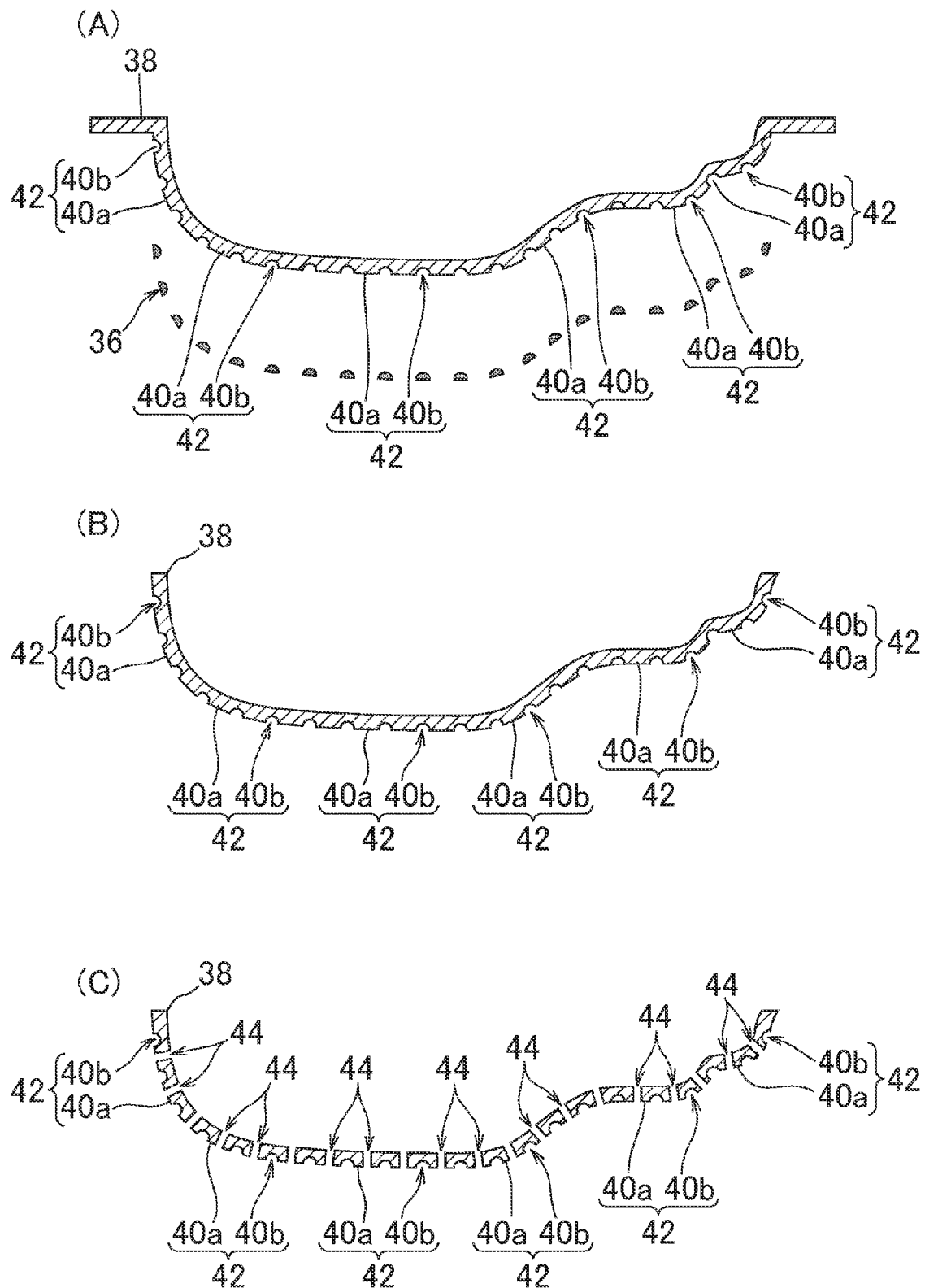
FIG. 17 is another process diagram showing essential parts showing the example of the manufacturing method of the one example (Example 2) according to the present invention, wherein (A) to (C) are sectional views showing essential parts of the manufacturing method.

FIG. 16 is a process diagram showing essential parts showing an example of a manufacturing method of one example (Example 2) according to the present invention, wherein (A) to (E) are sectional views showing essential parts of the manufacturing method. FIG. 17 is another process diagram showing essential parts showing the example of the manufacturing method of the one example (Example 2) according to the present invention, wherein (A) to (C) are sectional views showing essential parts of the manufacturing method.

In this Example 2, an injection molding tool including a male mold 110, which serves as a master mold for a resin molded article, and a female mold 120 and a surface texture reverse master 22 are prepared (male mold preparation step, female mold preparation step and reverse master preparation step).

(1) After a net 36 is placed on the female mold 120, a mold release process is performed by fluorine coating or spraying a silicone-based mold release agent. Further, the surface texture reverse master 22 having a thickness of 0.1 to 50 mm is placed on the male mold 110 which becomes the master mold by being manually attached using a vacuum suction force (impression step) [See FIG. 16(A)]

(2) The male mold 110 and the female mold 120 are arranged to face each other and are assembled with a clearance of 5 to 40 mm therebetween. [See FIG. 16(B)]

(3) A heat resistant resin material is vacuum-injected into the provided clearance part to form a surface-textured composite layer 38 (composite layer formation step). [See FIG. 16(C)]

(4) Only the female mold 120 is removed (female mold removal step). [See FIG. 16(D)]

(5) The surface texture reverse master 22 is separated from the surface-textured composite layer 38 and the male mold 110 is removed (male mold removal step and reverse master separation step). [See FIGS. 16(D), 16(E)]

(6) The net 36 adhering to the surface-textured composite layer 38 is separated to form uneven sections 40 including projections 40a and recesses 40b on the lower surface of the surface-textured composite layer 38 (uneven section formation step). [See FIG. 17(A)]

(7) Unnecessary parts are trimmed and, if necessary, through holes 44 for vacuum suction having a diameter of 150 to 220 μm are perforated in the surface-textured composite layer 38 by laser machining (through hole formation step). [See FIG. 17(B)]

Example 3

Figure 18:
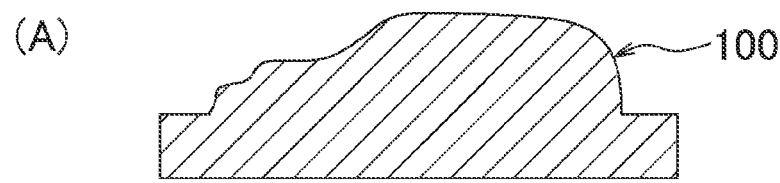
FIG. 18 is a process diagram showing essential parts showing an example of a manufacturing method of one example (Example 3) according to the present invention, wherein (A) to (E) are sectional views showing essential parts of the manufacturing method.
Figure 18:
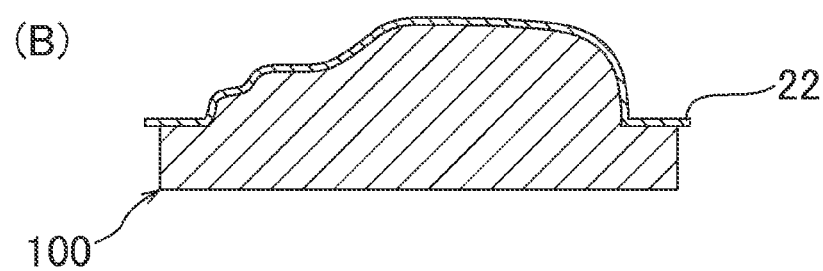
Figure 18:
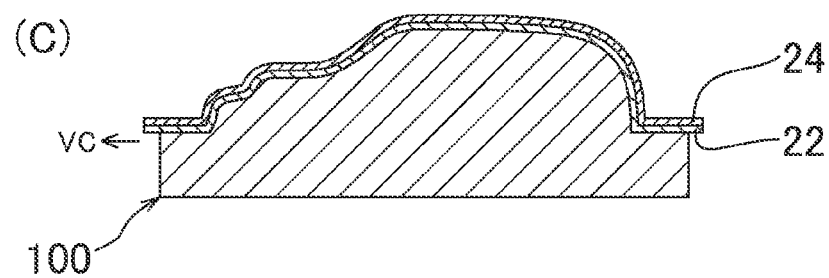
Figure 18:
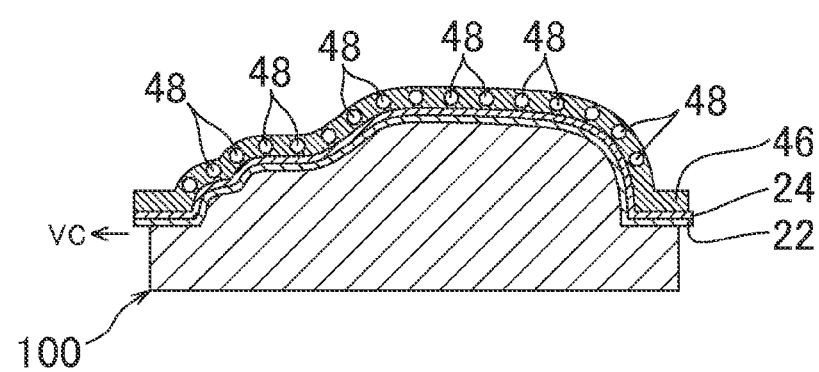
Figure 18:
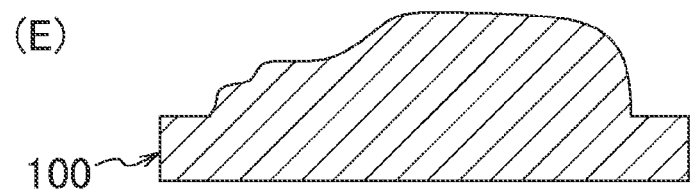
Figure 19:
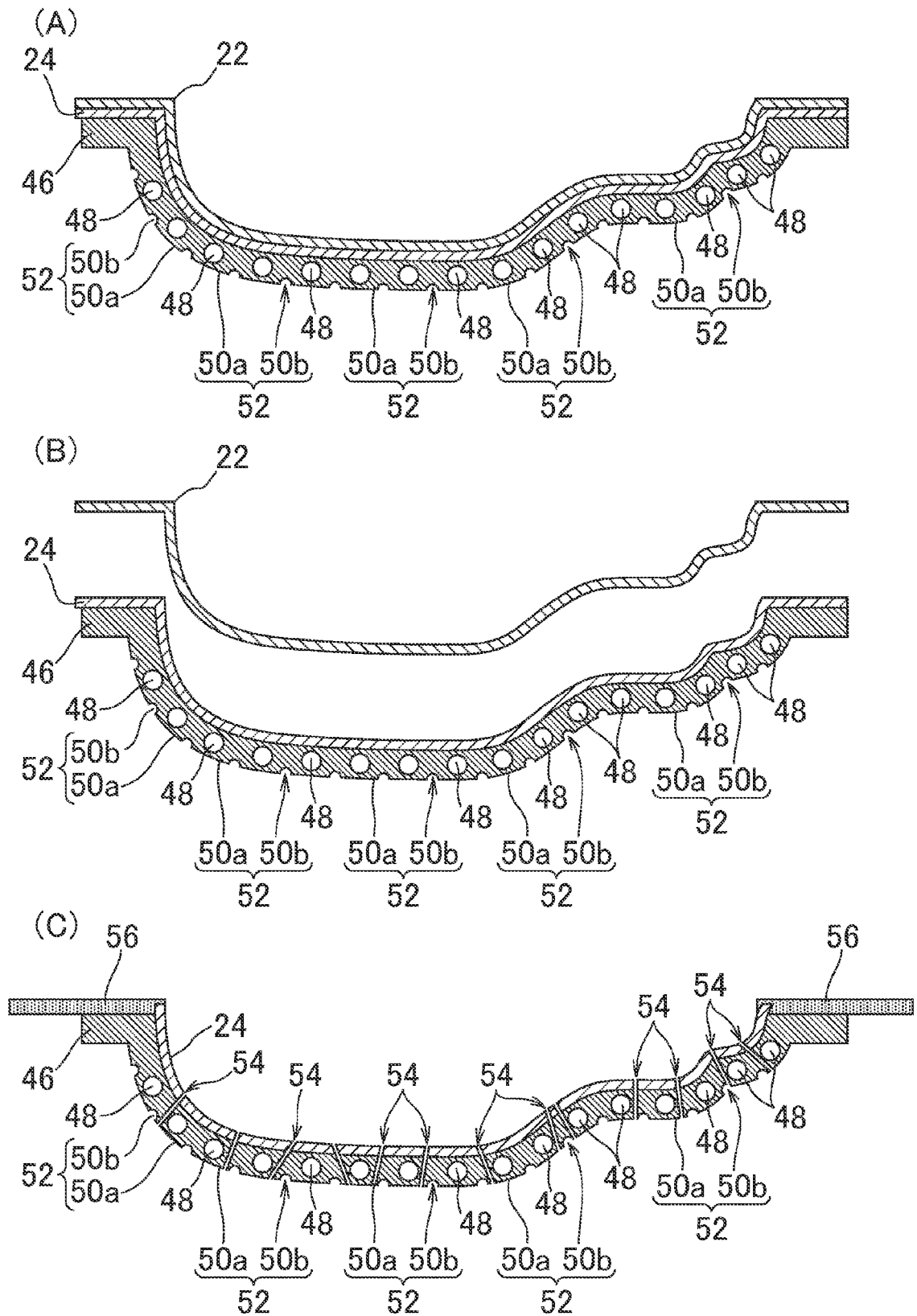
FIG. 19 is another process diagram showing essential parts showing the example of the manufacturing method of the one example (Example 3) according to the present invention, wherein (A) to (C) are sectional views showing essential parts of the manufacturing method.

FIG. 18 is a process diagram showing essential parts showing an example of a manufacturing method of one example (Example 3) according to the present invention, wherein (A) to (E) are sectional views showing essential parts of the manufacturing method. FIG. 19 is another process diagram showing essential parts showing the example of the manufacturing method of the one example (Example 3) according to the present invention, wherein (A) to (C) are sectional views showing essential parts of the manufacturing method.

(1) A master mold 100 is prepared (master mold preparation step). [See FIG. 18(A)]

(2) A surface texture reverse master 22 having a thickness of 0.1 to 50 mm is placed on the master mold 100 by being manually attached using a vacuum suction force (impression step). [See FIG. 18(B)]

(3) A surface-textured composite layer 24 is formed by applying a heat resistant material onto the surface texture reverse master 22 to have a thickness of 3 to 30 mm (composite layer formation step). [See FIG. 18(C)]

(4) A reinforcement layer 46 having a thickness of 3 to 30 mm is provided and tubes 48 such as cooling pipes and heaters are embedded in this reinforcement layer 46 (reinforcement layer formation step). [See FIG. 18(D)]

(5) Only the master mold is removed (removal). [See FIG. 18(E)]

(6) Unnecessary parts are trimmed and uneven sections 50 including projections 50a and recesses 50b are formed by engraving a surface texture pattern (grooves) for ventilation in the reinforcement layer 46, which becomes a surface to be held in contact with a molding tool, by machining (uneven section formation step). [See FIG. 19(A)]

(7) The surface texture reverse master 22 is separated (reverse master separation step). [See FIG. 19(B)]

(8) If necessary, the surface texture composite layer 24 including the reinforcement layer 46 is provided with a metal frame 56 used for fitting into a molding tool and through holes 54 for vacuum suction having a diameter of 150 to 220 μm are perforated by a laser beam machine (through hole formation step). [See FIG. 19(C)]

Figure 20:
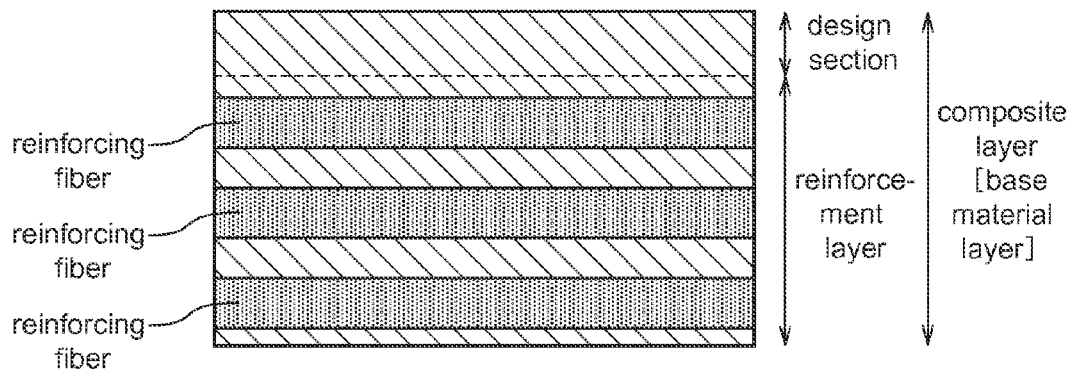
FIG. 20 is a sectional view showing an example of a reinforcement layer.
Figure 21:
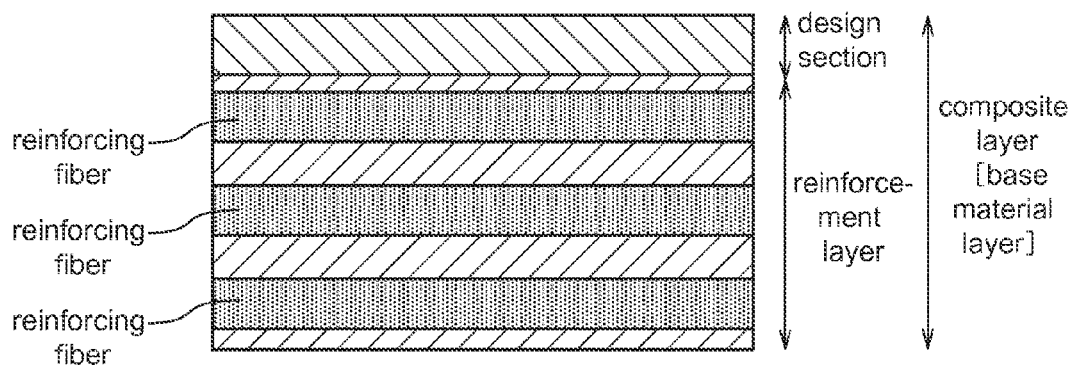
FIG. 21 is a sectional view showing another example of the reinforcement layer.
Figure 22:
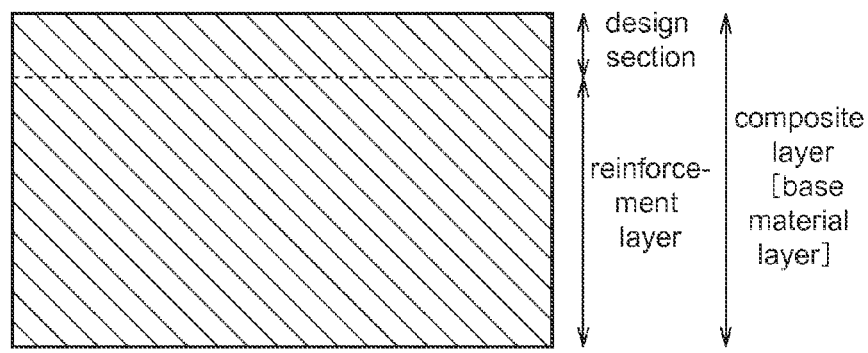
FIG. 22 is a sectional view showing still another example of the reinforcement layer.

A reinforcement layer which can be applied in the respective embodiments and Examples 1 to 3 descried above preferably has layer structures, for example, as shown in FIGS. 20, 21 and 22.

That is, in a reinforcement layer shown in FIG. 20, strength is compensated by providing reinforcing fibers such as a glass cloth in the reinforcement layer.

Further, in a reinforcement layer shown in FIG. 21, strength is compensated by the reinforcement layer formed of any one of or a plurality of heat resistant resin material, fiber material, ceramic material and metal material, for example, as a highly durable material. In this case, reinforcing fibers such as a glass cloth may or not may be provided.

Furthermore, in a reinforcement layer shown in FIG. 22, strength is compensated by increasing the thickness of the reinforcement layer by the heat resistant material forming the reinforcement layer shown in FIG. 21 to increase durability.

The invention claimed is:

1. A manufacturing method for a mold part for resin molding which is to be interchangeably attached to a molding tool and mold a resin molded article formed with a design on a product surface side, comprising:
   a step of forming a base material layer;
   a step of forming a design section on a surface which is on one principal surface side of the base material layer and becomes the product surface side; and
   a step of forming uneven sections, which form ventilation sections between the uneven sections and an inner surface of the molding tool, on a surface located on the other principal surface side of the base material layer and to be held in contact with the inner surface of the molding tool;
   wherein at least the design section out of the base material layer and the design section is formed of a heat resistant material.

2. The manufacturing method according to claim 1 for a mold part for resin molding which is to be interchangeably attached to a molding tool and mold a resin molded article formed with a design on a product surface side, comprising:
   preparing a mold for molding the resin molded article;
   preparing a reverse master formed of a flexible material and having an uneven surface as a transfer surface for forming a design surface of the product surface side;
   forming a composite layer, including the base material layer and the design section, which is arranged on the transfer surface and becomes the design on the product surface side, with the mold; and
   separating the reverse master from the composite layer.

3. The manufacturing method according to claim 2 for a mold part for resin molding, further comprising forming a reinforcement layer for supporting and reinforcing the design section.

4. The manufacturing method according to claim 2 for a mold part for resin molding, wherein:
   the mold includes a master mold for the resin molded article; and
   the manufacturing method comprises:
      preparing the master mold for the resin molded article;
      impressing a shape of the master mold by attaching and temporarily fixing a surface opposite to the transfer surface along a surface of the master mold;
      applying a heat resistant material to the transfer surface of the reverse master while the reverse master is temporarily fixed to the master mold, the heat resistant material for forming the composite layer;
      removing the master mold from the reverse master;
      separating the reverse master from the composite layer after the removing the master mold.

5. The manufacturing method according to claim 4 for a mold part for resin molding, further comprising forming a reinforcement layer for supporting and reinforcing the design section.

6. The manufacturing method according to claim 2 for a mold part for resin molding, wherein:
   the mold includes an injection mold including a male mold, which serves as a master mold for the resin molded article, and a female mold; and
   the manufacturing method comprises:
      preparing the male mold;
      impressing the shape of the male mold by attaching and temporarily fixing a surface of the reverse master opposite to the transfer surface along a surface of the male mold;
      arranging the female mold to face the male mold while being spaced apart from the male mold by a predetermined distance;
      pouring a heat resistant material into a clearance between the male mold and the female mold and forming, on the transfer surface of the reverse master, the composite layer to be temporarily fixed to the male mold; and
      removing the female mold from the composite layer;
      removing the male mold from the composite layer.

7. The manufacturing method according to claim 6 for a mold part for resin molding, further comprising a step of forming a reinforcement layer for supporting and reinforcing the design section.

8. The manufacturing method according to claim 1 for a mold part for resin molding, further comprising forming a reinforcement layer for supporting and reinforcing the design section.

9. The manufacturing method according to claim 1 for a mold part for resin molding, further comprising forming the mold part for resin molding with through holes penetrating through the mold part for resin molding in a thickness direction.

* * * * *